United States Patent
Blenke et al.

(10) Patent No.: US 7,922,861 B2
(45) Date of Patent: Apr. 12, 2011

(54) PROCESSES FOR INCREASING STRENGTH IN DEFINED AREAS OF A LAMINATED ABSORBENT PRODUCT

(75) Inventors: Timothy J. Blenke, Neenah, WI (US); Peiguang Zhou, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 365 days.

(21) Appl. No.: 12/128,429

(22) Filed: May 28, 2008

(65) Prior Publication Data
US 2008/0289762 A1 Nov. 27, 2008

Related U.S. Application Data

(60) Division of application No. 10/266,440, filed on Oct. 8, 2002, now Pat. No. 7,396,782, and a division of application No. 11/959,284, filed on Dec. 18, 2007, now Pat. No. 7,745,356, said application No. 10/266,440 is a continuation-in-part of application No. 09/945,239, filed on Aug. 31, 2001, now abandoned.

(60) Provisional application No. 60/259,037, filed on Dec. 29, 2000.

(51) Int. Cl.
*B32B 27/32* (2006.01)
(52) U.S. Cl. .................. 156/334; 156/292; 156/289
(58) Field of Classification Search ............ 156/60, 156/292, 289, 334
See application file for complete search history.

(56) References Cited

U.S. PATENT DOCUMENTS

| | | | |
|---|---|---|---|
| 3,325,562 A | 6/1967 | Peterkin | |
| 3,338,992 A | 8/1967 | Kinney | |
| 3,341,394 A | 9/1967 | Kinney | |
| 3,370,106 A | 2/1968 | Hall, Jr. et al. | |
| 3,492,372 A | 1/1970 | Flanagan | |
| 3,502,538 A | 3/1970 | Petersen | |
| 3,502,763 A | 3/1970 | Hartmann | |
| 3,542,615 A | 11/1970 | Dobo et al. | |
| 3,634,546 A | 1/1972 | Hagemeyer | |
| 3,635,861 A | 1/1972 | Russell | |
| 3,686,107 A | 8/1972 | Russell | |
| 3,692,618 A | 9/1972 | Dorschner et al. | |

(Continued)

FOREIGN PATENT DOCUMENTS
CA 0803714 1/1969
(Continued)

OTHER PUBLICATIONS

Final Office action regarding U.S. Appl. No. 12/211,744, dated Mar. 9, 2010.

(Continued)

*Primary Examiner* — Khanh Nguyen
*Assistant Examiner* — Margaret Squalls
(74) *Attorney, Agent, or Firm* — Armstrong Teasdale LLP

(57) ABSTRACT

The present invention is generally directed to a process for increasing the strength of a component of a laminated absorbent article. The material basis weight of the component may be increased by introducing a material basis weight increasing agent onto at least a portion of the component. The material basis weight increasing agent comprises selected ratios of crystalline and amorphous polymers. In some versions of the invention, polymers capable of existing in different configurations (e.g., a polymer such as polypropylene which can exist in an atactic, syndiotactic, or isotactic configuration) are used to prepare the material basis weight increasing agents of the present invention.

16 Claims, 10 Drawing Sheets

U.S. PATENT DOCUMENTS

| | | |
|---|---|---|
| 3,717,601 A | 2/1973 | Jurrens |
| 3,802,817 A | 4/1974 | Matsuki et al. |
| 3,849,241 A | 11/1974 | Butin et al. |
| 3,850,858 A | 11/1974 | Park |
| 3,862,068 A | 1/1975 | Russell |
| 3,887,442 A | 6/1975 | Gilchrist |
| 3,900,694 A | 8/1975 | Jurrens |
| 3,909,009 A | 9/1975 | Cvetko et al. |
| 3,982,051 A | 9/1976 | Taft et al. |
| 4,013,816 A | 3/1977 | Sabee et al. |
| 4,022,728 A | 5/1977 | Trotter et al. |
| 4,041,203 A | 8/1977 | Brock et al. |
| 4,072,735 A | 2/1978 | Ardemagni |
| 4,077,410 A | 3/1978 | Butterworth et al. |
| 4,112,208 A | 9/1978 | McConnell et al. |
| 4,120,916 A | 10/1978 | Meyer, Jr. et al. |
| 4,143,858 A | 3/1979 | Schmidt, III et al. |
| 4,178,272 A | 12/1979 | Meyer, Jr. et al. |
| 4,186,258 A | 1/1980 | Schmidt, III et al. |
| 4,221,696 A | 9/1980 | Cook et al. |
| 4,259,220 A | 3/1981 | Bunnelle et al. |
| 4,296,750 A | 10/1981 | Woon et al. |
| 4,300,967 A | 11/1981 | Sigl |
| 4,340,563 A | 7/1982 | Appel et al. |
| 4,366,292 A | 12/1982 | Werner et al. |
| 4,437,860 A | 3/1984 | Sigl et al. |
| 4,460,728 A | 7/1984 | Schmidt, Jr. et al. |
| 4,486,192 A | 12/1984 | Sigl |
| 4,493,868 A | 1/1985 | Meitner |
| 4,554,304 A | 11/1985 | Hansen et al. |
| 4,568,713 A | 2/1986 | Hansen et al. |
| 4,573,991 A | 3/1986 | Pieniak et al. |
| 4,610,681 A | 9/1986 | Strohbeen et al. |
| 4,641,381 A | 2/1987 | Heran et al. |
| 4,650,481 A | 3/1987 | O'Connor et al. |
| 4,654,040 A | 3/1987 | Luceri |
| 4,663,220 A | 5/1987 | Wisneski et al. |
| 4,668,230 A | 5/1987 | Damico et al. |
| 4,704,116 A | 11/1987 | Enloe |
| 4,713,068 A | 12/1987 | Wang et al. |
| 4,719,261 A | 1/1988 | Bunnelle et al. |
| 4,761,450 A | 8/1988 | Lakshmanan et al. |
| 4,762,520 A | 8/1988 | Wallstrom |
| 4,774,292 A | 9/1988 | Thiersault et al. |
| 4,777,073 A | 10/1988 | Sheth |
| 4,784,892 A | 11/1988 | Storey et al. |
| 4,798,603 A | 1/1989 | Meyer et al. |
| 4,823,783 A | 4/1989 | Willhite, Jr. et al. |
| 4,824,889 A | 4/1989 | Mostert |
| 4,826,909 A | 5/1989 | Lakshmanan et al. |
| 4,833,192 A | 5/1989 | Lakshmanan et al. |
| 4,857,594 A | 8/1989 | Lakshmanan et al. |
| 4,881,683 A | 11/1989 | Linnemann |
| 4,937,138 A | 6/1990 | Mostert |
| 4,939,202 A | 7/1990 | Maletsky et al. |
| 4,940,464 A | 7/1990 | Van Gompel et al. |
| 4,949,668 A | 8/1990 | Heindel et al. |
| 4,965,122 A | 10/1990 | Morman |
| 4,998,928 A | 3/1991 | Maletsky et al. |
| 5,026,752 A | 6/1991 | Wakabayashi et al. |
| 5,096,532 A | 3/1992 | Neuwirth et al. |
| 5,110,403 A | 5/1992 | Ehlert |
| 5,171,239 A | 12/1992 | Igaue et al. |
| 5,176,668 A | 1/1993 | Bernardin |
| 5,176,672 A | 1/1993 | Bruemmer et al. |
| 5,192,606 A | 3/1993 | Proxmire et al. |
| 5,211,792 A | 5/1993 | Carter |
| 5,213,881 A | 5/1993 | Timmons et al. |
| 5,219,633 A | 6/1993 | Sabee |
| 5,226,992 A | 7/1993 | Morman |
| 5,234,422 A | 8/1993 | Sneller et al. |
| 5,334,446 A | 8/1994 | Quantrille et al. |
| 5,336,545 A | 8/1994 | Morman |
| 5,344,691 A | 9/1994 | Hanschen et al. |
| 5,364,382 A | 11/1994 | Latimer et al. |
| 5,397,846 A | 3/1995 | Eichhorn et al. |
| 5,434,004 A | 7/1995 | Ajioka et al. |
| 5,468,320 A | 11/1995 | Zafiroglu |
| 5,468,428 A | 11/1995 | Hanschen et al. |
| 5,472,792 A | 12/1995 | Tsurutani et al. |
| 5,478,891 A | 12/1995 | Lakshmanan et al. |
| 5,482,761 A | 1/1996 | Palumbo et al. |
| 5,486,166 A | 1/1996 | Ellis et al. |
| 5,490,846 A | 2/1996 | Ellis et al. |
| 5,496,298 A | 3/1996 | Kuepper et al. |
| 5,498,463 A | 3/1996 | McDowall et al. |
| 5,503,076 A | 4/1996 | Yeo |
| 5,509,915 A | 4/1996 | Hanson et al. |
| 5,512,625 A | 4/1996 | Butterbach et al. |
| 5,516,572 A | 5/1996 | Roe |
| 5,516,848 A | 5/1996 | Canich et al. |
| 5,530,054 A | 6/1996 | Tse et al. |
| 5,536,563 A | 7/1996 | Shah et al. |
| 5,539,056 A | 7/1996 | Yang et al. |
| 5,540,796 A | 7/1996 | Fries |
| 5,548,014 A | 8/1996 | Tse et al. |
| 5,595,618 A | 1/1997 | Fries |
| 5,596,042 A | 1/1997 | Itoh et al. |
| 5,643,240 A | 7/1997 | Jackson et al. |
| 5,667,608 A | 9/1997 | Rajala et al. |
| 5,670,580 A | 9/1997 | Tazaki et al. |
| 5,705,011 A | 1/1998 | Bodford et al. |
| 5,723,546 A | 3/1998 | Sustic |
| 5,763,534 A | 6/1998 | Srinivasan et al. |
| 5,773,515 A | 6/1998 | Srinivasan et al. |
| 5,785,697 A | 7/1998 | Trombetta et al. |
| 5,786,418 A | 7/1998 | Strelow et al. |
| 5,795,344 A | 8/1998 | Chappell |
| 5,822,884 A | 10/1998 | Roeder |
| 5,827,254 A | 10/1998 | Trombetta et al. |
| 5,834,385 A | 11/1998 | Blaney et al. |
| 5,843,267 A | 12/1998 | Cashaw et al. |
| 5,849,003 A | 12/1998 | Olsen et al. |
| 5,858,515 A | 1/1999 | Stokes et al. |
| 5,882,769 A | 3/1999 | McCormack et al. |
| 5,888,604 A | 3/1999 | Evans, Jr. et al. |
| 5,902,297 A | 5/1999 | Sauer |
| 5,904,672 A | 5/1999 | LeMahieu et al. |
| 5,904,675 A | 5/1999 | Laux et al. |
| 5,939,483 A | 8/1999 | Kueppers |
| 5,947,949 A | 9/1999 | Inoue et al. |
| 5,985,971 A | 11/1999 | Srinivasan et al. |
| 5,994,614 A | 11/1999 | Wada et al. |
| 5,998,524 A | 12/1999 | Srinivasan et al. |
| 6,008,148 A | 12/1999 | Harris et al. |
| 6,020,535 A | 2/2000 | Blenke et al. |
| 6,024,822 A | 2/2000 | Alper et al. |
| 6,034,159 A | 3/2000 | Malcolm |
| 6,045,895 A | 4/2000 | Hyde et al. |
| 6,080,818 A | 6/2000 | Thakker et al. |
| 6,087,550 A | 7/2000 | Anderson-Fischer et al. |
| 6,114,261 A | 9/2000 | Strelow et al. |
| 6,140,551 A | 10/2000 | Niemeyer et al. |
| 6,143,818 A | 11/2000 | Wang et al. |
| 6,177,605 B1 | 1/2001 | Trombetta et al. |
| 6,184,294 B1 | 2/2001 | Park et al. |
| 6,207,748 B1 | 3/2001 | Tse et al. |
| 6,211,272 B1 | 4/2001 | Shafer et al. |
| 6,218,457 B1 | 4/2001 | Fralich et al. |
| 6,231,555 B1 | 5/2001 | Lynard et al. |
| 6,235,356 B1 | 5/2001 | Shibuya et al. |
| 6,239,047 B1 | 5/2001 | Erdos et al. |
| 6,248,832 B1 | 6/2001 | Peacock |
| 6,248,834 B1 | 6/2001 | Mori |
| 6,276,032 B1 | 8/2001 | Nortman et al. |
| 6,284,943 B1 | 9/2001 | Osborn, III et al. |
| 6,288,171 B2 | 9/2001 | Finerman et al. |
| 6,329,468 B1 | 12/2001 | Wang |
| 6,428,525 B1 | 8/2002 | Malowaniec |
| 6,436,083 B1 | 8/2002 | Mishima et al. |
| 6,443,936 B1 | 9/2002 | Hamilton et al. |
| 6,452,063 B1 | 9/2002 | Curro et al. |
| 6,482,192 B2 | 11/2002 | Haarer et al. |
| 6,572,596 B2 | 6/2003 | Pargass et al. |
| 6,610,383 B1 | 8/2003 | Morman et al. |
| 6,610,904 B1 | 8/2003 | Thomas et al. |
| 6,632,212 B1 | 10/2003 | Morman et al. |

| | | | |
|---|---|---|---|
| 6,639,020 B1 | 10/2003 | Brant | |
| 6,747,114 B2 | 6/2004 | Karandinos et al. | |
| 6,774,069 B2 | 8/2004 | Zhou et al. | |
| 6,835,678 B2 | 12/2004 | Jackson et al. | |
| 6,887,941 B2 | 5/2005 | Zhou | |
| 6,890,630 B2 | 5/2005 | Franklin et al. | |
| 7,396,782 B2 | 7/2008 | Blenke et al. | |
| 2001/0010990 A1 | 8/2001 | Erdos et al. | |
| 2002/0010265 A1 | 1/2002 | Johnson et al. | |
| 2002/0019187 A1 | 2/2002 | Carroll et al. | |
| 2002/0039637 A1 | 4/2002 | Meece et al. | |
| 2002/0064639 A1 | 5/2002 | Rearick et al. | |
| 2002/0098353 A1 | 7/2002 | Kollaja et al. | |
| 2002/0122953 A1 | 9/2002 | Zhou | |
| 2002/0123538 A1 | 9/2002 | Zhou et al. | |
| 2002/0123726 A1 | 9/2002 | Zhou et al. | |
| 2002/0124956 A1 | 9/2002 | Zhou | |
| 2002/0177376 A1 | 11/2002 | Welch et al. | |
| 2003/0092792 A1 | 5/2003 | Blenke et al. | |
| 2003/0092813 A1 | 5/2003 | Blenke et al. | |
| 2004/0127123 A1 | 7/2004 | Jordan et al. | |

FOREIGN PATENT DOCUMENTS

| | | | |
|---|---|---|---|
| CA | 2056812 A | | 3/1993 |
| DE | 69404495 T2 | | 1/1998 |
| DE | 69225749 T2 | | 10/1998 |
| EP | 0205242 B2 | | 4/1986 |
| EP | 0285430 A2 | | 3/1988 |
| EP | 0315013 A2 | | 5/1989 |
| EP | 0217032 | | 2/1992 |
| EP | 0611801 B1 | | 7/1997 |
| EP | 0527589 B1 | | 6/1998 |
| EP | 1039007 A1 | | 8/1999 |
| EP | 1050612 A1 | | 5/2000 |
| EP | 0758675 A2 | | 1/2001 |
| GB | 1159601 A | | 7/1969 |
| JP | 6281470 | | 4/1987 |
| JP | 63303109 | | 5/1987 |
| JP | 1111016 | | 10/1987 |
| JP | 10086256 | | 9/1996 |
| JP | 10168726 | | 12/1996 |
| JP | 11290381 | | 4/1998 |
| JP | 2000314068 | | 5/1999 |
| WO | 8607242 A1 | | 12/1986 |
| WO | 8905334 | | 6/1989 |
| WO | 9118573 | | 12/1991 |
| WO | 9606966 A1 | | 3/1996 |
| WO | 9837144 | | 8/1998 |
| WO | 9914039 A1 | | 3/1999 |
| WO | 9925296 | | 5/1999 |
| WO | 0037723 A2 | | 6/2000 |
| WO | 0044412 A1 | | 8/2000 |
| WO | 0115646 A1 | | 3/2001 |
| WO | 0149913 A1 | | 7/2001 |
| WO | 0222344 A1 | | 9/2001 |
| WO | 02085273 A1 | | 10/2002 |

OTHER PUBLICATIONS

Non-final Office Action Received in U.S. Appl. No. 11/958,237 mailed Apr. 29, 2009.
Non-final Office action issued in U.S. Appl. No. 11/959,284, dated Apr. 23, 2009.
Final Office action regarding U.S. Appl. No. 10/744,332, dated Jun. 22, 2009.
Joseph, Marjory I., Introductory Textile Science 1986, p. 1, Hold, Rinehart, and Winston, New York.
International Search Report from PCT/US2004/033461 dated Feb. 14, 2005.
International Search Report from PCT/US2004/033454 dated Feb. 17, 2005.
International Search Report from PCT/US2004/038341 dated Feb. 17, 2005.
Final Office Action regarding U.S. Appl. No. 11/959,284, dated Sep. 22, 2009.
Non-final Office Action regarding U.S. Appl. No. 11/958,237, dated Sep. 18, 2009.
"Tacticity" from Wikipedia, the free encyclopedia.
Non-final Office action regarding U.S. Appl. No. 10/744,332, dated Sep. 16, 2009.
Non-final Office action regarding U.S. Appl. No. 12/211,744, dated Aug. 17, 2009.
Final Office Action regarding U.S. Appl. No. 10/744,332, dated Mar. 24, 2010.
Office Action issued in German Patent Application No. 10197127.3 on Mar. 17, 2010.
Office action from U.S. Appl. No. 11/550,595, dated Feb. 3, 2009.
Nonfinal Office action from U.S. Appl. No. 11/550,595, dated Nov. 27, 2007 (16 pages).
PCT/US01/48372 PCT International Written Opinion dated Aug. 30, 2006.
Final Office action regarding U.S. Appl. No. 11/958,237, dated Jun. 25, 2010.
Communication pursuant to Article 94(3) EPC for European Application No. EP 04794725.4, dated Jun. 8, 2010.
US 5,915,536, 06/1999, Alberts et al. (withdrawn)*

* cited by examiner

PROCESSES FOR INCREASING STRENGTH IN DEFINED AREAS OF A LAMINATED ABSORBENT PRODUCT

This patent application is a divisional patent application of U.S. patent application Ser. No. 10/266,440, filed on Oct. 8, 2002, now U.S. Pat. No. 7,396,782, and U.S. patent application Ser. No. 11/959,284, filed on Dec. 18, 2007, now U.S. Pat. No. 7,745,356. U.S. patent application Ser. No. 10/266,440 further claims priority as a continuation-in-part patent application of U.S. patent application Ser. No. 09/945,239 filed on Aug. 31, 2001, now abandoned, which claims priority from U.S. Provisional Patent Application 60/259,037 filed on Dec. 29, 2000.

BACKGROUND OF THE INVENTION

People rely on disposable absorbent articles to make their lives easier. Disposable absorbent articles, such as adult incontinence articles and diapers, are generally manufactured by combining several components. These components typically include a liquid-permeable topsheet; a liquid-impermeable backsheet attached to the topsheet; and an absorbent core located between the topsheet and the backsheet. When the disposable article is worn, the liquid-permeable topsheet is positioned next to the body of the wearer. The topsheet allows passage of bodily fluids into the absorbent core. The liquid-impermeable backsheet helps prevent leakage of fluids held in the absorbent core. The absorbent core generally is designed to have desirable physical properties, e.g. a high absorbent capacity and high absorption rate, so that bodily fluids can be transported from the skin of the wearer into the disposable absorbent article.

Frequently one or more components of a disposable absorbent article are adhesively bonded together. For example, adhesives have been used to bond individual layers of the absorbent article, such as the topsheet (also known as, for example, the body-side liner) and backsheet (also known as, for example, the outer cover), together. Adhesive has also been used to bond discrete pieces, such as fasteners and leg elastics, to the article. In many cases, the bonding together of components forms a laminated structure in which adhesive is sandwiched between materials (such as layers of polymer film and/or layers of woven or nonwoven fabrics) that make up the components being bonded together.

In many instances, a hot-melt adhesive, i.e. a polymeric formulation that is heated to substantially liquefy the formulation prior to application to one or both materials when making a laminate, is used in making a laminated structure. While such formulations generally work, they can be costly and their performance properties can be improved. For example, adhesion can be improved to help provide a sturdier laminate (e.g., to improve the integrity or strength of the bond between two components in a disposable absorbent article). Alternatively, the propensity of hot-melt adhesives to migrate from the laminated structure and onto the surfaces of equipment, such as ultrasonic-bonding equipment used to ultrasonically bond layers, can be reduced or eliminated.

There is a need or desire for an adhesive composition that possesses one or more performance characteristics that are comparable to, or better than, one or more of the same performance characteristics (e.g., bond strength) of a conventional hot-melt adhesive and that will typically cost less than a conventional hot-melt adhesive. Laminated structures and disposable absorbent articles employing the adhesive composition would benefit from these improved characteristics. There is also a need or desire for efficient methods of making the adhesive composition, and efficient methods of making laminated structures and disposable absorbent articles employing the adhesive composition.

SUMMARY OF THE INVENTION

The present invention is generally directed to adhesive compositions comprising selected ratios of crystalline and amorphous polymers, the adhesive compositions having better performance characteristics and/or costing less than conventional hot-melt adhesives. For example, we have discovered that the performance characteristics of an adhesive composition comprising a polymer which can assume different configurations (e.g., an atactic, isotactic, and/or syndiotactic configuration, as defined below) can be improved by manipulating the ratio of the configurations present in the adhesive composition (e.g., by increasing the amount of a polymer having an isotactic configuration, which typically has a higher degree of crystallinity compared to the other configurations, relative to the amount of polymer having an atactic configuration, which typically has a lower degree of crystallinity compared to the other configurations). So, for example, we have found that a material comprising a combination of atactic polypropylene and isotactic polypropylene possesses desirable adhesive properties and may be used to make laminated structures and disposable absorbent articles.

An atactic, or amorphous, polymer is generally less likely to assume a crystalline structure. An isotactic polymer is generally more likely to assume a crystalline structure. Without being bound to any particular theory, it is believed that a material comprising a specified combination of atactic and isotactic polymers, such as atactic and isotactic polypropylene, possesses regions, and/or characteristics, of both a crystalline material and an amorphous material. By changing the relative amounts of atactic and isotactic polymer, or for that matter the relative amounts of polymer having differing degrees of crystallinity, one can change the performance characteristics of the resulting adhesive composition. The adhesive compositions of the present invention generally perform better, and cost less, than conventional hot-melt adhesives. It should be understood, however, that the present invention encompasses adhesive compositions comprising selected polymers having different degrees of crystallinity, such as an adhesive composition comprising atactic and isotactic polypropylene, whether or not the composition possesses all of the advantages discussed herein.

As stated above, a material comprising a combination of an atactic and isotactic polymer, such as a material comprising atactic polypropylene and isotactic polypropylene, may cost less than a conventional hot-melt adhesive. Generally this is because conventional hot-melt adhesives are typically formulated by combining several components, including a polymer or polymers for cohesive strength; resins, tackifiers, or other generally low molecular-weight materials for adhesive strength; viscosity modifiers such as oils or wax-like materials; and other additives (e.g., antioxidants). In some versions of the invention, a combination of the atactic and isotactic polymer alone provides improved bond characteristics compared to conventional hot-melt adhesives. But it should be understood that the present invention encompasses adhesive compositions that include selected atactic, isotactic, and/or syndiotactic polymers, or selected polymers having different degrees of crystallinity, combined with other additives or materials.

Another advantage present in some versions of the present invention is that the compositions may be used in conventional hot-melt-adhesive processing equipment. Thus the adhesive material may be used in equipment already installed for the purpose of processing and applying conventional hot-melt adhesives.

Apart from whether or not adhesive compositions of the present invention cost less than conventional hot-melt adhesives, we have found that representative embodiments of our present invention possess improved performance characteristics compared to the performance characteristics of conventional hot-melt adhesives. These performance benefits may justify processing and applying adhesive compositions of the present invention in modified conventional-hot-melt-adhesive equipment, or in equipment especially designed and built for the purpose of processing and applying adhesive compositions of the present invention. Furthermore, these performance benefits may justify adhesive compositions of the present invention, in some instances, being at a higher cost than conventional-hot-melt adhesives.

A look at one set of results presented in the Examples below demonstrates one advantage that is present in at least some versions of the present invention. In one example, 8 different adhesives, one of which was an example of the present invention, were used to bond two substrates together. All of the test laminates were made using conventional hot-melt processing equipment in which both the conventional hot-melt adhesives and an adhesive of the present invention were substantially liquefied at a temperature ranging from about 350 degrees Fahrenheit to about 380 degrees Fahrenheit. The substantially liquefied adhesive was then conducted from the hot-melt tank, by a gear pump, to a point of application proximate to one of the substrates used to make the laminate. Each of the 8 laminates employing a different adhesive composition was then subjected to a test designed to evaluate the integrity or strength of the bond between the two substrates (again, described in more detail below). The 7 laminates each comprising a different, conventional hot-melt adhesive failed in about 4 hours or less (failure meaning that the two substrates, initially joined using the adhesive, became completely detached from one another; this time of failure is identified as the static-peel-failure time). The laminate employing an adhesive composition of the present invention did not exhibit a bonding failure after 30 hours. Instead, one of the substrates itself failed during the test; i.e., the bond did not fail, there was a failure of the material because the bond was stronger than the material.

One version of an adhesive composition possessing features of the present invention comprises an atactic polymer having a degree of crystallinity of about 20% or less, specifically a crystallinity of about 15% or less, and a number-average molecular weight of from about 1000 to about 300,000, specifically about 3000 to about 100,000; and an isotactic polymer having a degree of crystallinity of about 40% or more, specifically of about 60% or more, particularly of about 80% or more, and a number-average molecular weight of from about 3000 to about 200,000, more particularly of about 10,000 to about 100,000; wherein the adhesive composition is hot-melt processable at a temperature of about 450 degrees Fahrenheit or less, specifically at a temperature of about 400 degrees Fahrenheit or less, particularly at a temperature of about 375 degrees Fahrenheit or less, and suitably at a temperature of about 350 degrees Fahrenheit or less.

This adhesive composition can have a melt index between about 100 and about 2000 grams per 10 minutes, or between about 200 and about 1800 grams per 10 minutes, or between about 500 and about 1500 grams per 10 minutes, as determined using ASTM D 1238. The melt index is dependent upon the crystallinity, molecular weight, and the molecular weight distribution of the polymers included in the adhesive composition. In some versions of the invention, the atactic polymer is present in an amount of about 50 to about 90 weight percent and the isotactic polymer is present in an amount of about 5 to about 50 weight percent. The concept of an adhesive composition being hot-melt processable is discussed in more detail below. The atactic polymer may be the same as the isotactic polymer (e.g., both may be polypropylene, as described below, or both may be polystyrene, polybutene, polyethylene, or combinations of any of these, for example), or the atactic polymer may be different from the isotactic polymer. The term "high density polyethylene" (HDPE) is used to refer to polyethylene that is essentially isotactic, while the term "low density polyethylene" (LDPE) is used to refer to polyethylene that is essentially atactic. HDPE generally has a density in a range of about 0.935 to 0.980 grams per cubic centimeter, while LDPE generally has a density in a range of about 0.910 to 0.935 grams per cubic centimeter.

For purposes of this application, weight percent is defined as the mass of one type of polymer (e.g., atactic) in the adhesive composition divided by the sum of the masses of other types of polymer (e.g., atactic and isotactic) in the adhesive composition, plus the mass(es) of any additional component(s) that might be present in the adhesive composition, with this value being multiplied by 100. So, for example, if we form an adhesive composition comprising 40 grams of atactic polypropylene with 60 grams of isotactic polypropylene, the combination includes 40 weight percent atactic polypropylene.

One version of an adhesive composition possessing features of the present invention comprises atactic polypropylene having a degree of crystallinity of about 20% or less, specifically a crystallinity of about 15% or less, and a number-average molecular weight of from about 1000 to about 300,000, specifically about 3000 to about 100,000; and isotactic polypropylene having a degree of crystallinity of about 40% or more, specifically of about 60% or more, particularly of about 80% or more, and a weight average molecular weight of from about 3000 to about 200,000, more particularly of about 10,000 to about 100,000; wherein the adhesive composition is hot-melt processable at a temperature of about 450 degrees Fahrenheit or less. This adhesive composition can have a melt index between about 100 and about 2000 grams per 10 minutes, or between about 200 and about 1800 grams per 10 minutes, or between about 500 and about 1500 grams per 10 minutes. Another version of an adhesive composition of the present invention provides that the adhesive composition is hot-melt processable at a temperature of about 400 degrees Fahrenheit or less, specifically at a temperature of about 375 degrees Fahrenheit or less, and more specifically at a temperature of about 350 degrees Fahrenheit or less. Still another version of an adhesive composition of the present invention provides that the atactic polypropylene is present in amount of about 50 to about 90 weight percent and the isotactic polypropylene is present in an amount of about 5 to about 50 weight percent.

In another aspect, the invention encompasses laminated structures employing versions of the adhesive composition as described above. For example, one version of a laminated structure of the present invention comprises a first layer and a second layer, wherein at least a portion of the first layer is attached to at least a portion of the second layer using an adhesive composition that is the same as, or analogous to, one or more of the versions described above, and wherein the laminated structure has a static-peel-failure time of at least about 1 hour, specifically of at least about 8 hours, and particularly of at least about 24 hours.

In yet another aspect, a laminated structure of the present invention comprises a first layer and a second layer, wherein at least a portion of the first layer is attached to at least a portion of the second layer using an adhesive composition that is the same as, or analogous to, one or more of the versions described above, and wherein the laminated structure has a relative accretion value of less than 1, or less than 0.5, or less than 0.2 (or, alternatively, an accretion value that is substantially zero, or an accretion value that is less than the accretion value of a conventional hot-melt adhesive for which an adhesive composition of the present invention is substituted). A relative accretion value of less than 1 means that the adhesive composition of the present invention builds up on processing equipment, such as ultrasonic-bonding equipment, at a rate, or in an amount, less than a conventional hot-melt adhesive that is selected as the comparator. In some versions of the invention, a laminated structure employing an adhesive composition having features of the present invention, when passed through a unit operation in which the laminated structure is exposed to energy (e.g., ultrasonic energy, infrared energy, thermal energy by conductive or convective transport, and/or the like), produces substantially no build up of the adhesive composition on surfaces of equipment that make up that unit operation (e.g., the surfaces of ultrasonic-bonding equipment used to ultrasonically bond materials).

For any of the laminated structures described above, the first and second layer may be part of one-and-the-same substrate. That is, the substrate may be folded over and joined to itself using an adhesive composition of the present invention.

Furthermore, the first layer, second layer, or both may comprise a variety of materials, including, but not limited to a nonwoven (e.g., a necked-bonded laminate or a spun-bond material); a film; a woven material; an elasticized component; a substrate comprising cellulosic material, thermoplastic material, or both; some combination of these; or the like.

In yet another aspect, an absorbent article may be formed that employs an adhesive composition of the present invention and/or a laminated structure of the present invention. So, for example, one version of an absorbent article of the present invention comprises a liquid-permeable topsheet; a liquid-impermeable backsheet; and a laminated structure having features of the present invention, such as one or more of the versions described above. Some or all of the backsheet may include the laminated structure; some or all of the topsheet may include the laminated structure; the laminated structure may be attached, directly or indirectly, to the backsheet, the topsheet, or both; or a laminated structure or structures may be present in some combination of these.

In addition to various versions of adhesive compositions, laminated structures, and absorbent products of the present invention, the present invention also encompasses methods of making these compositions, structures, and articles of manufacture.

One version of a method of making a laminated structure having features of the present invention comprises the steps of providing a first substrate; providing a second substrate; providing an atactic polymer having a degree of crystallinity of about 20% or less, specifically a crystallinity of about 15% or less, and a number-average molecular weight of from about 1000 to about 300,000, specifically about 3000 to about 100,000; providing an isotactic polymer having a degree of crystallinity of about 40% or more, specifically of about 60% or more, particularly of about 80% or more, and a number-average molecular weight of from about 3000 to about 200,000, more particularly of about 10,000 to about 100,000; heating the atactic polymer and the isotactic polymer so that they are sufficiently liquefied for blending; blending the heated atactic polymer and the heated isotactic polymer to form an adhesive composition that is melt-processable at a temperature of less than about 450 degrees Fahrenheit, specifically of less than about 400 degrees Fahrenheit, particularly of less than about 375 degrees Fahrenheit, and suitably of less than about 350 degrees Fahrenheit; applying the adhesive composition to the first substrate, the second substrate, or both substrates; and joining at least a portion of the first substrate to at least a portion of the second substrate so that some or all of the applied adhesive composition is positioned between the first substrate and second substrate. In some methods of the present invention, the atactic polymer is present in an amount of about 50 to about 90 weight percent and the isotactic polymer is present in an amount of about 5 to about 50 weight percent. The isotactic polymer and the atactic polymer may be the same polymer (e.g., atactic polypropylene and isotactic polypropylene, or atactic polystyrene and isotactic polystyrene, or atactic polybutene and isotactic polybutene, or HDPE and LDPE, or combinations of the same polymers), or different polymers.

It should be understood that the atactic and isotactic polymers could be heated and blended at a site other than the site where the laminate is being formed. For example, atactic and isotactic polymer could be blended using an extruder or hot-melt processing equipment at a first geographic location. The blend could then be allowed to cool and processed to make a solid form (e.g., pellets). The atactic/isotactic polymer blend, in solid form, could then be shipped from the first geographic site to a site where a laminate is to be made. The blend, in solid form, would simply be heated to substantially liquefy the adhesive composition prior to its being used to make a laminate.

It should also be understood that a method having features of the present invention encompasses different sequences of steps by which the adhesive composition is made. For example, the atactic polymer could be heated in a first container; the isotactic polymer could be heated in a second container, before, after, or concurrently with the heating of the atactic polymer; and then the two substantially liquefied polymers could be blended in the first container, the second container, or a third container. Alternatively, one of an atactic or isotactic polymer could be heated in a container, and after the selected polymer was substantially liquefied, the remaining polymer could be added to the same container to be heated and blended. In another alternative, the atactic and isotactic polymer could be added to the same container to be heated and blended at the same time. In other words, our invention contemplates various methods and sequences by which selected amounts of polymer having an atactic, isotactic, and/or syndiotactic configuration (plus any other optional additives), or selected amounts of polymers having different degrees of crystallinity, are heated and blended to form an adhesive composition of the present invention.

The preceding discussion assumes that the atactic polymer and isotactic polymer are in substantially solid form at room temperature, or temperatures that are typically present in a working environment suitable for human beings. To the extent that the atactic polymer or isotactic polymer is available in substantially liquid form, then those steps providing for heating and liquefying that material (i.e., the already-liquefied material) can be omitted from methods of the present invention.

Another version of a method of making a laminated structure having features of the present invention comprises the steps of providing a first substrate; providing a second substrate; providing atactic polypropylene having a degree of crystallinity of about 20% or less, specifically a crystallinity of about 15% or less, and a number-average molecular weight of from about 1000 to about 300,000, specifically about 3000 to about 100,000; providing isotactic polypropylene having a degree of crystallinity of about 40% or more, specifically of about 60% or more, particularly of about 80% or more, and a number-average molecular weight of from about 3000 to about 200,000, more particularly of about 10,000 to about 100,000; heating the atactic polypropylene and the isotactic polypropylene so that they are sufficiently liquefied for blending; blending the heated atactic polypropylene and the heated isotactic polypropylene to form an adhesive composition that is melt-processable at a temperature of less than about 450 degrees Fahrenheit, specifically of less than about 400 degrees Fahrenheit, particularly of less than about 375 degrees Fahrenheit, and suitably of less than about 350 degrees Fahrenheit; applying the adhesive composition to the first substrate, the second substrate, or both substrates; and joining at least a portion of the first substrate to at least a portion of the second substrate so that some or all of the applied adhesive composition is positioned between the first substrate and second substrate. In some methods of the present invention, atactic polypropylene is present in amount of about 50 to about 90 weight percent and isotactic polypropylene is present in an amount of about 5 to about 50 weight percent.

Again, as mentioned above, the present invention encompasses different sequences of steps and unit operations for making an adhesive composition of the present invention.

Furthermore, the methods described above encompass the first layer, second layer, or both comprising a variety of materials, including, but not limited to a nonwoven (e.g., a neck-bonded laminate or a spun-bond material), a film, a woven material, an elasticized component, a substrate comprising cellulosic material and/or a thermoplastic material, some combination of these, or the like. Also, methods of making a laminated structure of the present invention encompass the first and second layer being part of one-and-the-same substrate. That is, the substrate may be folded over and joined to itself using an adhesive composition of the present invention.

A method of making an adhesive composition having features of the present invention comprises the steps of: providing atactic polymer having a degree of crystallinity of about 20% or less, specifically a crystallinity of about 15% or less, and a number-average molecular weight of from about 1000 to about 300,000, specifically of from about 3000 to about 100,000; providing isotactic polymer having a degree of crystallinity of about 40% or more, specifically of about 60% or more, particularly of about 80% or more, a number-average molecular weight of from about 3000 to about 200,000, more particularly of about 10,000 to about 100,000; heating the atactic polymer and the isotactic polymer so that they are sufficiently liquefied for blending; and blending the heated atactic polymer and the heated isotactic polymer to form an adhesive composition that is melt-processable at a temperature of less than about 450 degrees Fahrenheit, specifically of less than about 400 degrees Fahrenheit, particularly of less than about 375 degrees Fahrenheit, and suitably of less than about 350 degrees Fahrenheit. In some methods of the present invention, the atactic polymer is present in amount of about 50 to about 90 weight percent and the isotactic polymer is present in an amount of about 5 to about 50 weight percent. The isotactic polymer and the atactic polymer may be the same polymer (e.g., atactic polypropylene and isotactic polypropylene, or atactic polystyrene and isotactic polystyrene, or atactic polybutene and isotactic polybutene, or HDPE and LDPE), or different polymers. Furthermore, the atactic polymer may also include amorphous polyolefin copolymer, such as butene-ethylene copolymer and/or propylene-ethylene copolymer, for example.

Another method of making an adhesive composition having features of the present invention comprises the steps of: providing atactic polypropylene having a degree of crystallinity of about 20% or less, specifically a crystallinity of about 15% or less, and a number-average molecular weight of from about 1000 to about 300,000, specifically about 3000 to about 100,000; providing isotactic polypropylene having a degree of crystallinity of about 40% or more, specifically of about 60% or more, particularly of about 80% or more, and a number-average molecular weight of from about 3000 to about 200,000, more particularly of about 10,000 to about 100,000; heating the atactic polypropylene and the isotactic polypropylene so that they are sufficiently liquefied for blending; and blending the heated atactic polypropylene and the heated isotactic polypropylene to form an adhesive composition that is melt-processable at a temperature of less than about 450 degrees Fahrenheit, specifically of less than about 400 degrees Fahrenheit, particularly of less than about 375 degrees Fahrenheit, and suitably of less than about 350 degrees Fahrenheit. In some methods of the present invention, the atactic polypropylene is present in amount of about 50 to about 90 weight percent and the isotactic polypropylene is present in an amount of about 5 to about 50 weight percent.

One version of a method in which an adhesive composition of the present invention is metered or delivered at a desired rate to a unit operation (e.g., a unit operation where the adhesive composition is applied to a substrate or substrates in order to make a laminate) comprises the steps of: determining the amount of adhesive composition being used by the unit operation per unit time; and force-adjusting the volumetric flow rate or the mass flow rate of the adhesive composition so that the amount of adhesive composition being metered or delivered to the unit operation corresponds to the amount of adhesive composition being used by the unit operation per unit time.

These and other features, aspects, and advantages of the present invention will become better understood with regard to the following description, appended claims, and accompanying drawings.

DETAILED DESCRIPTION OF THE PRESENTLY PREFERRED EMBODIMENTS

Figure 1:
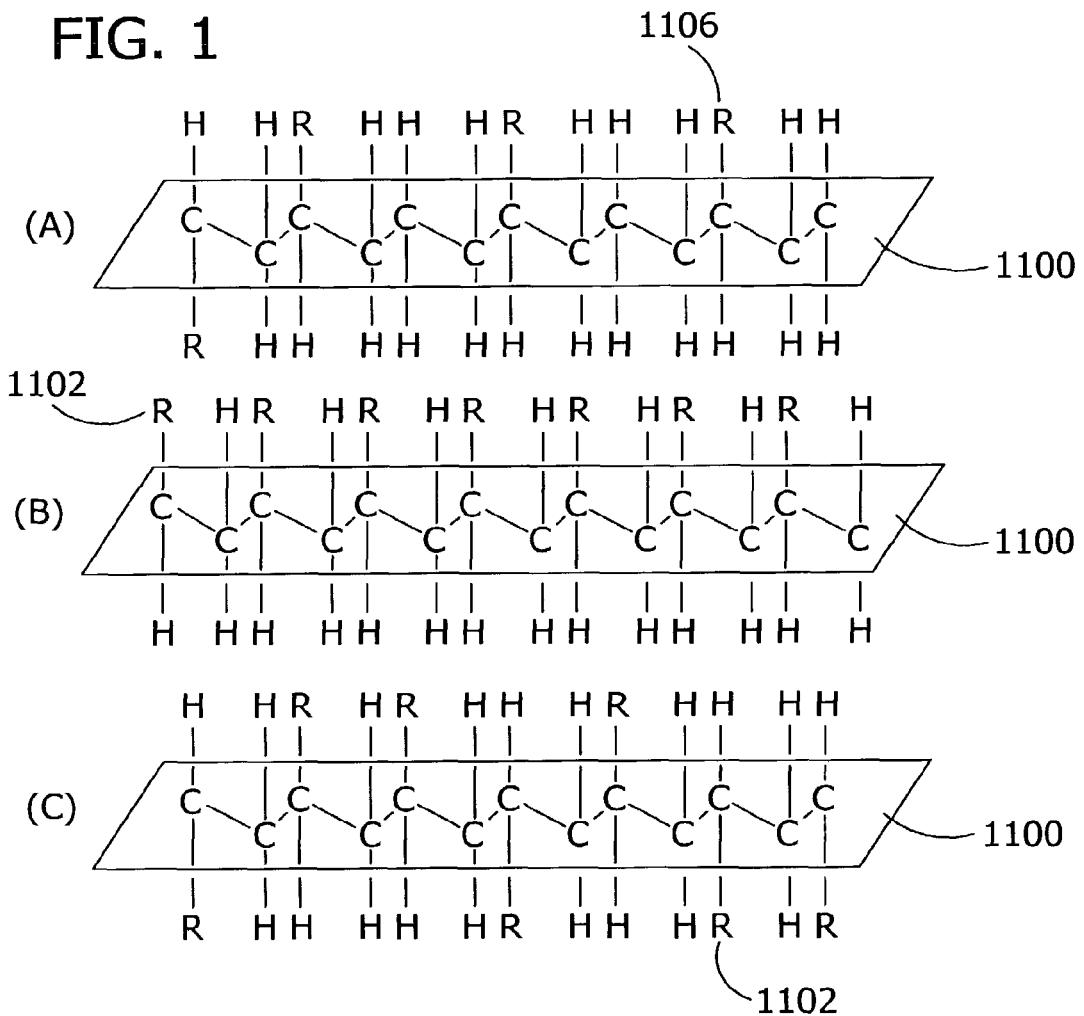
FIG. 1 gives symbolic representations of syndiotactic, isotactic, and atactic configurations of a polymer.

The present invention is generally directed to adhesive compositions comprising selected ratios of crystalline and amorphous polymers. For example, the present invention encompasses adhesive compositions comprising selected amounts of polymers having different configurations (e.g., a combination of atactic polypropylene and isotactic polypropylene). Adhesive compositions of the present invention generally perform better, and typically cost less, than conventional hot-melt adhesives. Furthermore, these compositions may typically be processed and applied using conventional hot-melt adhesive processing equipment. Generally new equipment will not be necessary to use adhesive compositions of the present invention.

Before describing representative embodiments of the invention, it is useful to define a number of terms for purposes of this application. These definitions are provided to assist the reader of this document.

"Nonwoven" fabric or web means a web having a structure of individual fibers or threads that are interlaid, but not in a regular or identifiable manner as in a knitted fabric. Nonwoven fabrics or webs have been formed from many processes such as, for example, meltblowing processes, spunbonding processes, air laying processes, and bonded carded web processes. The basis weight of nonwoven fabrics is usually expressed in ounces of material per square yard (osy) or grams per square meter (gsm) and the fiber diameters are usually expressed in microns. (Note: to convert from osy to gsm, multiply osy by 33.91.)

"Woven" fabric or web means a fabric or web containing a structure of fibers, filaments, or yarns, which are arranged in an orderly, inter-engaged fashion. Woven fabrics typically contain inter-engaged fibers in a "warp" and "fill" direction. The warp direction corresponds to the length of the fabric while the fill direction corresponds to the width of the fabric. Woven fabrics can be made, for example, on a variety of looms including, but not limited to, shuttle looms, rapier looms, projectile looms, air jet looms, and water jet looms.

"Spunbonded fibers", or "spundbond fibers", means small-diameter fibers that are typically formed by extruding molten thermoplastic material as filaments from a plurality of fine capillaries of a spinneret having a circular or other configuration, with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Petersen, and U.S. Pat. No. 3,542,615 to Dobo et al., each of which is incorporated by reference in its entirety and in a manner consistent with the present document. Spunbond fibers are quenched and generally not tacky when they are deposited onto a collecting surface. Spunbond fibers are generally continuous and often have average diameters larger than about 7 microns, and more particularly between about 10 and 30 microns. A spunbond material, layer, or substrate comprises spunbonded (or spunbond) fibers.

The term "meltblown fibers" means fibers formed by extruding a molten material, typically thermoplastic in nature, through a plurality of fine, usually circular, die capillaries as molten threads or filaments into converging high-velocity heated gas (e.g., air) streams that attenuate the filaments of molten material to reduce their diameter, which may be to microfiber diameter. Thereafter, the meltblown fibers are carried by the high-velocity gas stream and are deposited on a collecting surface to form a web of randomly dispersed meltblown fibers. Such a process is disclosed for example, in U.S. Pat. No. 3,849,241 to Butin. Meltblown fibers are microfibers which may be continuous or discontinuous, are generally smaller than 10 microns in diameter, and are generally self-bonding when deposited onto a collecting surface.

As used herein, the term "microfibers" means small-diameter fibers having an average diameter not greater than about 100 microns, for example, having a diameter of from about 0.5 microns to about 50 microns, more specifically microfibers may also have an average diameter of from about 1 micron to about 20 microns. Microfibers having an average diameter of about 3 microns or less are commonly referred to as ultra-fine microfibers. A description of an exemplary process of making ultra-fine microfibers may be found in, for example, U.S. Pat. No. 5,213,881, entitled "A Nonwoven Web With Improved Barrier Properties".

"Conventional hot-melt adhesive" means a formulation that generally comprises several components. These components typically include one or more polymers to provide cohesive strength (e.g., aliphatic polyolefins such as poly (ethylene-co-propylene) copolymer; ethylene vinyl acetate copolymers; styrene-butadiene or styrene-isoprene block copolymers; etc.); a resin or analogous material (sometimes called a tackifier) to provide adhesive strength (e.g., hydrocarbons distilled from petroleum distillates; rosins and/or rosin esters; terpenes derived, for example, from wood or citrus, etc.); perhaps waxes, plasticizers or other materials to modify viscosity (i.e., flowability) (examples of such materials include, but are not limited to, mineral oil, polybutene, paraffin oils, ester oils, and the like); and/or other additives including, but not limited to, antioxidants or other stabilizers. A typical hot-melt adhesive formulation might contain from about 15 to about 35 weight percent cohesive strength polymer or polymers; from about 50 to about 65 weight percent resin or other tackifier or tackifiers; from more than zero to about 30 weight percent plasticizer or other viscosity modifier; and optionally less than about 1 weight percent stabilizer or other additive. It should be understood that other adhesive formulations comprising different weight percentages of these components are possible.

While certain versions of the present invention encompass combinations of atactic and isotactic polymers only (e.g., atactic polypropylene and isotactic polypropylene), it should be understood that other embodiments of the present invention comprise components in addition to combinations of atactic and isotactic polymers (or components in addition to selected amounts of polymers having different degrees of crystallinity).

"Hot-melt processable" means that an adhesive composition may be liquefied using a hot-melt tank (i.e., a system in which the composition is heated so that it is substantially in liquid form; see, e.g., the adhesive-supply unit referred to in the Example 1 below) and transported via a pump (e.g., a gear pump or positive-displacement pump) from the tank to the point of application proximate to a substrate or other material; or to another tank, system, or unit operation (e.g., a separate system, which may include an additional pump or pumps, for delivering the adhesive to the point of application). Hot-melt tanks used to substantially liquefy a hot-melt adhesive typically operate in a range from about 100 degrees Fahrenheit to about 450 degrees Fahrenheit. Generally, at the point of application, the substantially liquefied adhesive composition will pass through a nozzle or bank of nozzles, but may pass through some other mechanical element such as a slot. A hot-melt processable adhesive composition is to be contrasted with a composition that requires a conventional extruder, and the attendant pressures and temperatures characteristic of an extruder, to liquefy, mix, and/or convey the composition. While a hot-melt tank and pump in a hot-melt processing system can handle adhesive-composition viscosities in a range of up to 50,000 centipoise, an extruder can handle and process adhesive-composition viscosities in a range from about 10,000 centipoise to viscosities of several hundred thousand centipoise. An advantage of some adhesive compositions of the present invention is that said compositions are hot-melt processable; i.e., the combination comprising isotactic and atactic polymers may be substantially liquefied in a hot-melt tank and conveyed to the point of application via a pump. As was stated above, however, some adhesive compositions of the present invention may not possess this particular advantage.

Unless otherwise noted, "laminated structure" or "laminate" means a structure in which one layer, material, component, web, or substrate is adhesively bonded, at least in part, to another layer, material, component, web, or substrate. As stated elsewhere in this application, a layer, material, component, web, or substrate may be folded over and adhesively bonded to itself to form a "laminated structure" or "laminate."

"Polymer", as used herein, generally includes, but is not limited to, homopolymers, copolymers, such as, for example, block, graft, random and alternating copolymers, terpolymers, and blends and modifications thereof. As is explained in this document, polymers may assume different configurations, including isotactic, atactic, and syndiotactic configurations. "Configuration" describes those arrangements of atoms that cannot be altered except by breaking and reforming primary chemical bonds (i.e., covalent bonds). In contrast, "conformation" describes arrangements that can be altered by rotating groups of atoms around single bonds. It should be noted that a single polymer chain may be synthesized such that some portions of the chain have an isotactic configuration and some portions of the chain have an atactic configuration.

A graphic example provides additional detail on the types of configurations mentioned above. If a polymer chain is depicted in a fully-extended, planar, zigzag conformation 1100, the configuration resulting when all the substituent groups R 1102 on the polymer lie above (depicted in FIG. 1B) or below (not depicted) the plane of the main chain is called "isotactic". If substituent groups lie alternately above and below the plane the configuration is called "syndiotactic" (depicted in FIG. 1A). And a random sequence of substituents lying above and below the plane is described as an "atactic" configuration (depicted in FIG. 1C). As discussed above, a polymer, or a region of a polymer, having an isotactic configuration is more likely to assume characteristics of a crystalline structure. For purposes of this invention, the term "isotactic polymer" refers to a polymer that is at least 60% isotactic, suitably at least 70% isotactic, alternatively at least 80% isotactic. A polymer, or a region of a polymer, having an atactic configuration is more likely to assume characteristics of an amorphous structure. An atactic polymer may assume some crystallinity, but the degree of crystallinity is typically less than 20%, or less than 15%. For purposes of this invention, the term "atactic polymer" refers to a polymer that may not be 100% atactic, but is at least 80% atactic. And a polymer, or a region of a polymer, having a syndiotactic configuration can assume characteristics of a crystalline structure, which is similar to the degree of crystallinity in an isotactic configuration.

Figure 2:
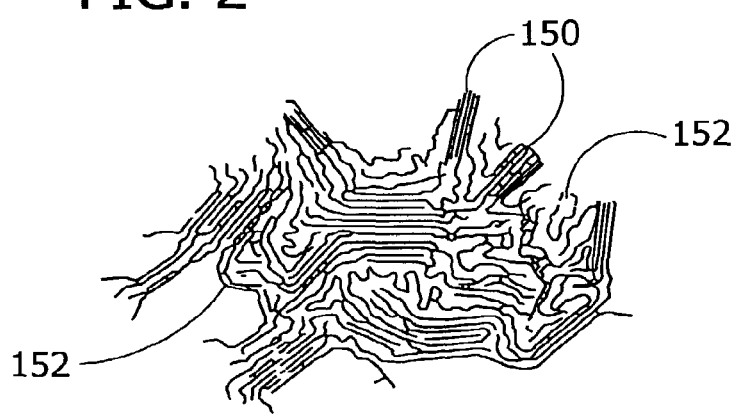
FIG. 2 gives a visual representation of a fringed-micelle model of a material having both amorphous and crystalline regions.

In this application, "fringed-micelle model" means a theoretical construct characterizing polymeric structures that have both crystalline 150 and amorphous 152 regions (one version of a graphic depiction of a fringed-micellar structure is presented in FIG. 2). This model may be used to characterize the structure of an atactic polymer and an isotactic polymer individually, i.e., each polymer possesses both crystalline regions and amorphous regions. As explained above, the isotactic polymer likely possesses a greater degree of crystallinity compared to an atactic polymer. Furthermore, this model may be used to characterize the structure of a blend of isotactic polymer and atactic polymer. It should be understood that this model provides one possible view of characteristics of the present invention and in no way limits the scope thereof.

The term "open time," as used herein, refers to the length of time during which an adhesive composition remains tacky or sticky prior to drying. Open time is affected by isotacticity of a polymer, such that the greater the level of isotacticity the shorter the open time.

In the process description that follows, the preparation, processing, and application of an adhesive composition comprising atactic polypropylene and isotactic polypropylene is described. It should be understood, however, that this description is given as an example. Other processing methods and equipment may be used to prepare and deliver various adhesive compositions of the present invention.

Figure 3:
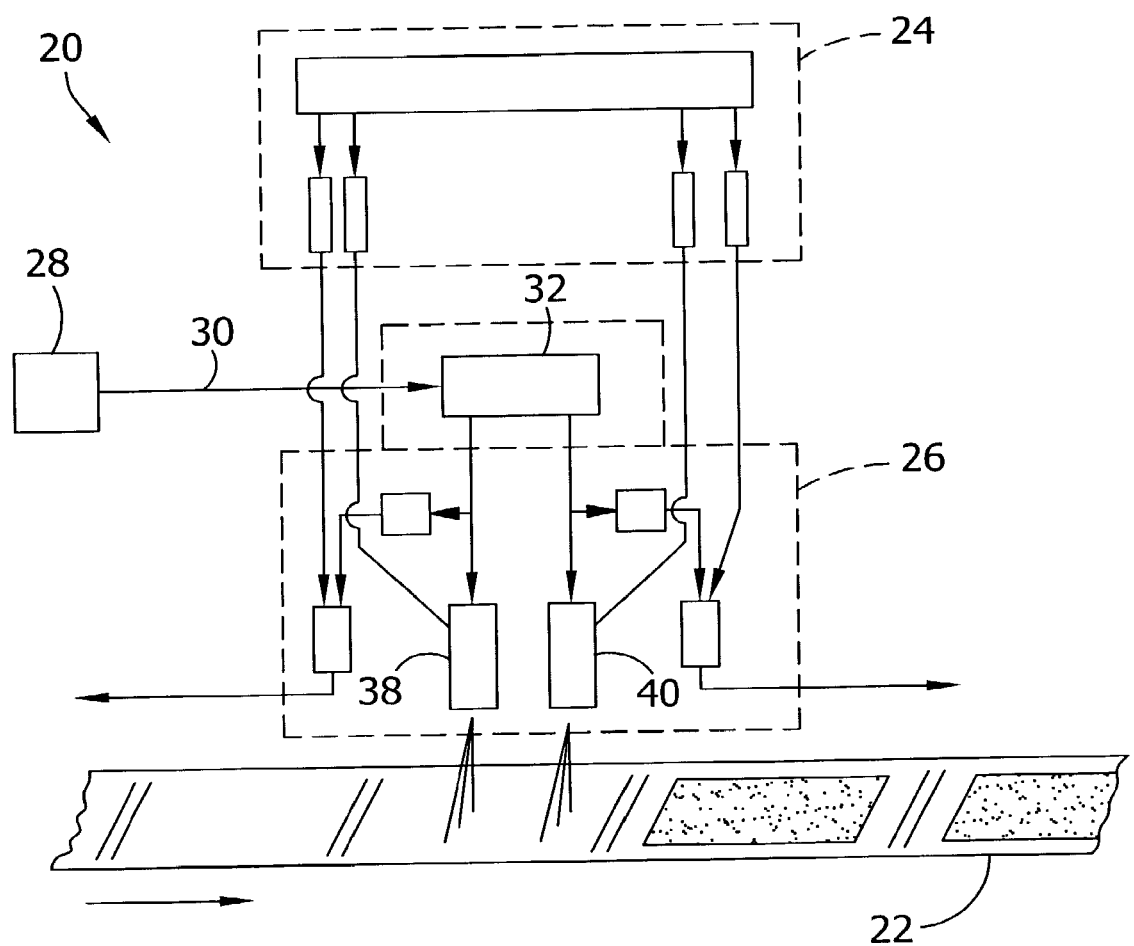
FIG. 3 shows a schematic diagram of one version of a method and apparatus for preparing, processing, and delivering an adhesive composition.

FIG. 3 shows a schematic diagram of an apparatus 20, and a method for spraying an adhesive composition, on a moving web 22. The apparatus 20 may include a programmable control system 24 that is operatively connected to a flow-control system 26. The combination of the programmable control system 24 and the flow-control system 26 are configured to control the delivery of an adhesive composition in liquid form to the moving web 22. Generally an adhesive composition is received in solid form at a manufacturing site where equipment such as that depicted in FIG. 3 is located. For example, hot-melt adhesive compositions may be received as solid pellets, blocks, or some other shape. The solid is then heated so that the hot-melt adhesive composition is in a form such that it can be conveyed, and applied, to a substrate or other material. Usually this requires that the heated hot-melt adhesive be in substantially liquid form. For the present invention, an adhesive composition comprising an atactic and isotactic polymer (e.g., atactic polypropylene and isotactic polypropylene), in solid form, might be received at a manufacturing site for heating and processing as described above. Alternatively, the atactic and isotactic polymer might be received as separate components to be blended at the manufacturing site (as discussed above in the Summary, the present invention encompasses a variety of sequences of steps for making adhesive compositions of the present invention). An example of equipment and methods for heating an adhesive composition, or precursor materials to the adhesive composition, are described in more detail below.

The apparatus may also include a position-sensing system that is configured to sense a position of the moving web 22 and, in response thereto, generate a signal that is sent to the programmable control system 24.

As representatively illustrated in FIG. 3, the continuously moving web 22 may be supplied by any means known to those skilled in the art, such as known conveyor systems. The continuously moving web 22 can include any type of layer or web of material, such as: films; nonwoven webs; woven webs which may include strands of thermoplastic material; an elasticized component; natural material such as threads of cotton and the like; laminate materials; or combinations thereof. More particularly, the continuously moving web 22 may include a necked-bonded laminate ("NBL"), which generally comprises a polyethylene layer sandwiched between two polypropylene, spunbonded layers; a polypropylene, spunbonded layer ("SB"); or an outercover comprising a polyethylene layer and a polypropylene, spunbonded layer. As is described below in more specific terms, the adhesive is sprayed on the continuously moving web 22 in a specific design or pattern for subsequent placement of or bonding to another material. The other material can be the same or different than the web to which adhesive was applied. In some cases adhesive might be applied to both substrates before they are joined together. And, as mentioned in the Summary section above, one substrate might be folded over and attached to itself to form a laminated structure.

The programmable control system 24 of the present invention is configured to send signals to the flow control system 26 which, in response thereto, is configured to initiate a spray of adhesive at the correct time to provide the desired pattern of adhesive on the moving web 22. As representatively illustrated in FIG. 3, the flow control system 26 includes an adhesive source 28 which is configured to deliver an adhesive through an adhesive supply line 30 to a metering mechanism 32. The adhesive can be delivered to the metering mechanism 32 by any means known to those skilled in the art, such as by the use of a pump.

The metering mechanism 32 is configured to continuously supply at least one independent, volumetric flow of adhesive to a respective nozzle. As used herein, the term "volumetric flow" refers to a flow of adhesive that has a predetermined volumetric flow rate. Such a "volumetric flow" may be provided by a positive-displacement metering pump which is configured to supply a specific volumetric flow which is independent of the manner in which the adhesive is supplied to the metering mechanism 32. As a result, for an adhesive that is at a given density, the metering mechanism 32 is configured to provide an independent, predetermined mass flow rate of adhesive to each nozzle. Other adhesive processing and delivery systems utilize pressure to provide a flow of adhesive.

The metering mechanism 32 of the present invention may be configured to supply a single, volumetric flow of adhesive to one nozzle or an independent, volumetric flow of adhesive to each of a plurality of nozzles depending upon the number of nozzles required to provide the desired pattern of adhesive on the moving web 22. A suitable device to provide the metering mechanism 32 may include a positive-displacement metering pump which is commercially available from May Coating Technologies, Acumeter Division, a business having offices located in Holliston, Mass., under the trade designation No. 19539. The metering mechanism 32 may include any other piston pump or gear pump which are well known to those skilled in the art.

The metering mechanism 32 may be configured to supply any desired volumetric flow rate of adhesive to each nozzle. For example, the metering mechanism 32 may be configured to provide a pre-determined volumetric flow rate of from about 1 to about 1000 cubic centimeters per minute and suitably from about 30 to about 180 cubic centimeters of adhesive per minute to each nozzle. The metering mechanism 32 may be configured to provide either a constant or a variable volumetric flow rate of adhesive to each nozzle. For example, if the metering mechanism 32 is a positive-displacement metering pump, the speed of the pump may be controlled to vary the volumetric flow rate of adhesive to the nozzles.

Each nozzle 38 and 40 as representatively illustrated in FIG. 3 can be any device which is capable of providing the desired pattern of adhesive on the moving web 22. For example, one suitable nozzle is commercially available from Nordson Corporation, a business having offices located in Duluth, Ga., under the trade designation Model No. 144906. Another suitable nozzle for use in the present invention is obtainable from ITW Dynatec Co. of Hendersonville, Tenn., under the trade designation number 057B1639, I.D. #A3. Such nozzles are typically configured to be operated between an on position and an off position to control the spray of adhesive from the nozzles. When operated in the on position, each nozzle may be configured to spray substantially the entire volumetric flow of adhesive which is independently supplied to it to more accurately control the amount and pattern of the adhesive on the moving web. The nozzles 38 and 40 may further be configured to include air streams that can be directed to provide a desired pattern in the spray of adhesive being dispensed from each nozzle. Such air streams can provide a desired adhesive spray pattern, such as a pattern of swirls of adhesive.

After the pattern of adhesive has been sprayed on the moving web 22, the web may be further processed in a variety of ways. For example, the continuously moving web 22 may be contacted by a second substrate web, such as a nonwoven layer, between a pair of nip rolls to adhesively join the two substrate webs together. Thereafter, this composite material or laminate may be used in a variety of ways such as in the construction of disposable absorbent articles such as diapers, incontinent articles, training pants, feminine care articles and the like.

The above discussion provides one example of hot-melt processing equipment 15 and a system for applying adhesive to a substrate. It should be understood that this is but one example, and that the present invention encompasses other systems for preparing and applying adhesives (see, e.g., U.S. Pat. No. 4,949,668, entitled "Apparatus for Sprayed Adhesive Diaper Construction," which issued on 21 Aug. 1990, and which is hereby incorporated by reference in its entirety and in a manner consistent with the present document).

Regardless of the system used to apply the adhesive, the resulting composite material or laminate may be exposed to thermal, infrared, ultrasonic, or other forms of energy in subsequent unit operations or processing steps. For example, the laminate or composite material may pass through an ultrasonic-bonding unit operation wherein the laminate or composite material are exposed to ultrasonic energy. After exemplary composite materials or laminates such as those referred to above are formed using an adhesive composition of the present invention, some or all of the composite or laminate may be exposed to ultrasonic energy. Referring to PCT International Publication Number WO 99/25296, which is hereby incorporated by reference in its entirety in a manner consistent with the present document, the publication discloses the use of ultrasonic bonding to form side seams or seals in the disposable underpant. (See, e.g., page 29, lines 10-25; additional detail regarding the forming of such side seals is disclosed in U.S. Pat. No. 4,610,681, which issued on 9 Sep. 1986 and is entitled "Disposable Underpants Having Discrete Outer Seals," and which is hereby incorporated by reference in a manner consistent with the present document; and U.S. Pat. No. 4,641,381, which issued on 10 Feb. 1997 and is entitled "Disposable Underpants, Such as Infant s Training Pants and the Like," which is also incorporated by reference in a manner consistent with the present document.) Thus adhesives of the present invention, used to make laminates and composite materials, may be exposed to ultrasonic energy when ultrasonic-bonding equipment is used in subsequent processing steps (e.g., when the ultrasonic bonding equipment is used to form the seams or seals in the disposable absorbent article as discussed above).

It has been observed that one or more components of some conventional hot-melt adhesives flow when exposed to ultrasonic energy. The flowing adhesive, or components thereof, may then penetrate through the laminate or composite material to contact the surfaces of ultrasonic-bonding equipment. Alternatively, or in addition to, this mechanism, the adhesive, or components thereof, may flow through gaps between a laminate or composite material and build up on the surface of the ultrasonic-bonding equipment. This in turn may lead to build up or accretion of adhesive on parts of the ultrasonic-bonding equipment. As the adhesive builds up, the adhesive may bind other materials such that the build up or accretion comprises both adhesive and other materials, such as fibers from a nonwoven web or other component or piece. This build up or accretion may decrease performance of the ultrasonic-bonding equipment, and may lead to increased down time of the production machine used to make the substrate composite and/or absorbent product.

As is discussed below in the Examples section, conventional hot-melt adhesives or one or more of their components do build up on the surface of ultrasonic-bonding equipment. We have found that some embodiments of adhesive compositions of the present invention either do not build up on the surfaces of ultrasonic-bonding equipment, or, if build-up occurs, the build-up occurs in an amount, or at a rate, that is less than the amount or rate of build-up associated with conventional hot-melt adhesives.

Without being bound to a particular theory, we believe that those embodiments of the present invention that do not contain significant amounts of low molecular-weight materials are less likely to flow when exposed to ultrasonic energy. Significant quantities of smaller molecules (such as a tackifier, resin, oil, or viscosity modifier), when exposed to ultrasonic energy, may assume fluid-like characteristics and migrate. Also, to the extent that the smaller molecules are absorbing ultrasonic energy, the ultrasonic bonding step is less efficient because some of the energy is not being used to weld or join substrates together, but instead is being absorbed by the smaller molecules in the adhesive. Absorption of energy by these smaller molecules results in the adhesive, or part of the adhesive, exhibiting viscous flow behavior. Accordingly, some embodiments of the present invention, which contain only specified amounts of polymer having an atactic, syndiotactic, and/or isotactic configuration (and optionally containing small amounts of certain additives), do not contain significant quantities of low molecular-weight materials. We believe these embodiments are less susceptible to flowing and building up on the surfaces of equipment when exposed to various forms of energy (e.g., ultrasonic energy when a laminate or composite material comprising the adhesive embodiment is processed in an ultrasonic-bonding unit operation).

In one embodiment of the invention, in addition to including an isotactic polymer and an atactic polymer, the adhesive composition also includes up to 50% by weight of a combination of additives, such as a tackifier, an anti-oxidizing agent, color pigment, filler, and/or a polymer compatibilizer. The adhesive composition may include any one or more of these additives. Examples of suitable tackifiers include PIC-COLYTE® S Resins, REGALITE® series, STAYBELITE® ester, each available from Hercules Incorporated, Wilmington, Del. The adhesive composition may suitably include 10 to 20 percent by weight tackifier. Examples of suitable anti-oxidizing agents include IRGANOX® 565, available from Ciba-Geigy, POLYGARD®, available from Uniroyal Chemical Co., and ANTIOXIDANT® series, available from Cytec Industries. The adhesive composition may suitably include 0.1 to 1.0 percent by weight antioxidant. Examples of suitable color pigments and fillers include $TiO_2$, carbon black, and calcium carbonate. The adhesive composition may suitably include 1 to 10 percent by weight color pigments and fillers. Examples of suitable polymer compatibilizers include polypropylene-b-polyethylene, polypropylene-b-polybutene diblock copolymers. The adhesive composition may suitably include 2 to 10 percent by weight polymer compatibilizer. In this embodiment, the adhesive composition suitably has an open time of up to 2 minutes. Alternatively, the adhesive composition can have an open time of up to 30 seconds, or up to 10 seconds, or as short as up to 1 second.

Figure 4A:
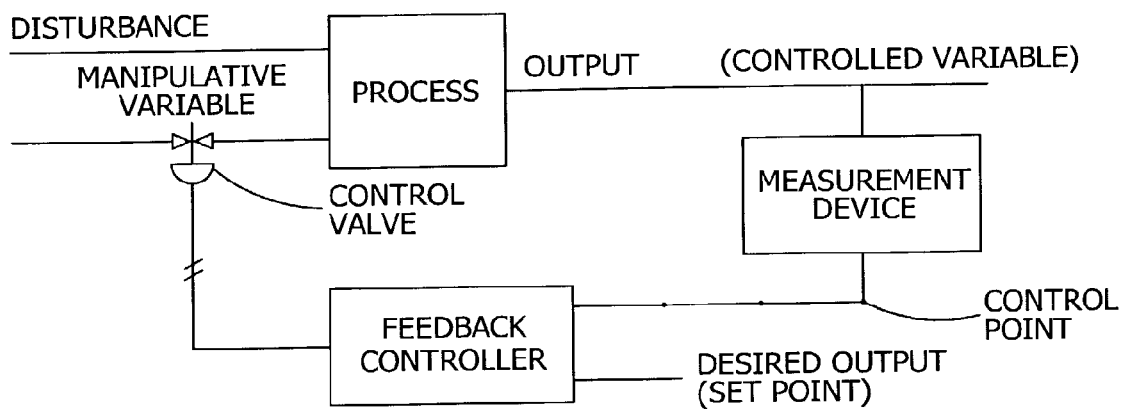
FIG. 4A shows one version of a feedback control scheme.
Figure 4B:
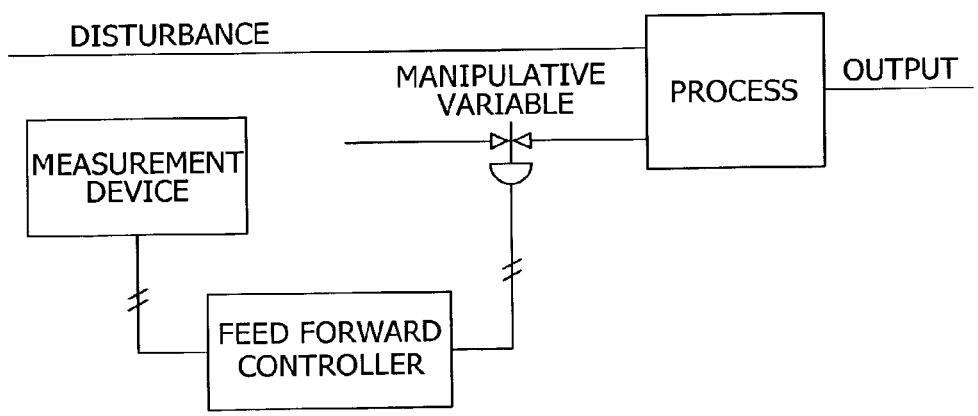
FIG. 4B shows one version of a feedforward control scheme.

Specific examples of composite materials, laminates, and disposable absorbent articles with which adhesives of the present invention may be utilized are disclosed in the following U.S. patents and U.S. patent applications: U.S. Pat. No. 4,798,603 issued Jan. 17, 1989, to Meyer et al.; U.S. Pat. No. 5,176,668 issued Jan. 5, 1993, to Bernardin; U.S. Pat. No. 5,176,672 issued Jan. 5, 1993, to Bruemmer et al.; U.S. Pat. No. 5,192,606 issued Mar. 9, 1993, to Proxmire et al.; U.S. Pat. No. 4,940,464, entitled "Disposable Incontinence Garment or Training Pant"; U.S. Pat. No. 5,904,675, entitled "Absorbent Article With Improved Elastic Margins and Containment System"; U.S. Pat. No. 5,904,672, entitled "Absorbent Article Having Improved Waist Region Dryness and Method of Manufacture"; and U.S. Pat. No. 5,902,297, entitled "Absorbent Article Having a Collection Conduit." Each of the preceding U.S. patents is incorporated by reference in its entirety and in a manner consistent with the present document. It should be understood that the present invention is applicable to other structures, composites, or products incorporating adhesive compositions of the present invention. Additional Detail on Representative Process-Control Embodiments As discussed above, process-control systems may be used to control the volumetric or mass flow rate of adhesive compositions of the present invention to a point of application (e.g., to a point of application on a substrate, layer, or web that will be used to make a laminate or composite material). Persons of ordinary skill in the art of process control are familiar with the various process-control strategies, algorithms, and equipment used to control a process. Some of the possible strategies that may be used to control a process include feedback-control strategies (i.e., a process in which a variable to be controlled is measured, the measured value is compared to a desired value, and the difference between the measured value and the desired value is transmitted to a feedback controller that force adjusts a manipulative variable to drive the measured variable back to the desired value) (see, e.g., FIG. 4A); feedforward-control strategies (i.e., a process in which a disturbance entering a process is detected, and an appropriate change is made to a manipulative variable so that an output variable is held constant; see, e.g., FIG. 4B); and the like.

Figure 5:
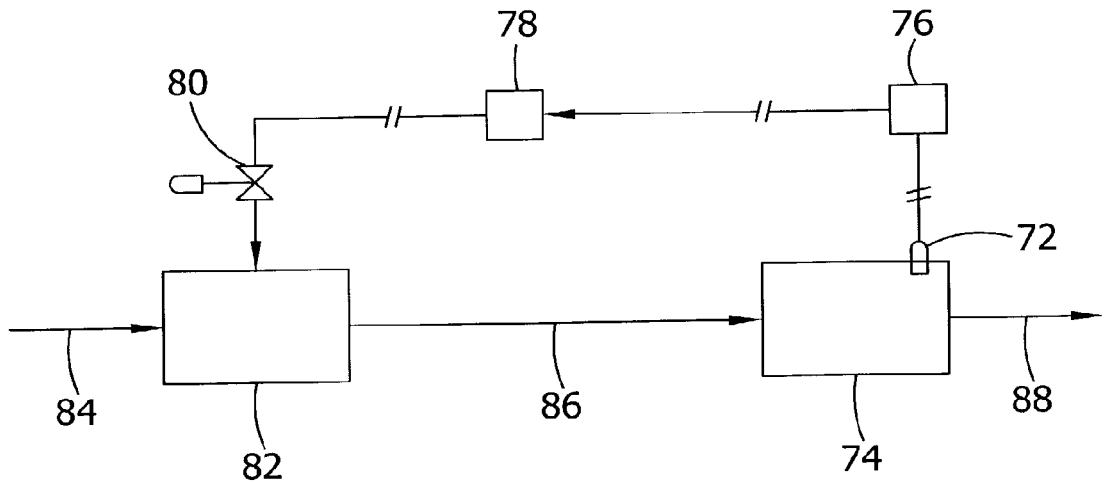
FIG. 5 shows one version of a process control system.

One example of a process-control system is depicted in FIG. 5. A sensor may be used to determine a signal $S_1$ corresponding to the variable to be controlled, e.g. the volumetric or mass flow rate of adhesive being sprayed or delivered in an adhesive-application unit operation 74. This signal may then be relayed electrically, pneumatically, hydraulically, or by other means to a transmitter 76, which converts the signal $S_1$ into a control signal $M_1$. The transmitter transmits the control signal $M_1$ to the controller 78.

After receiving the control signal $M_1$, the controller sends the corresponding output signal $R_1$ to the control element 80. The control element, such as an electronic or pneumatic control valve, responds to the output signal $R_1$ by opening or closing, thus effecting the desired change to the variable being manipulated, in this case the volumetric or mass flow rate of adhesive. Alternatively, the control element might effect a desired change to the speed at which a pump operates, thereby controlling the mass or volumetric flow rate of adhesive.

As mentioned above, an air-pressure, electrical, pneumatic, or other signal may be used to transmit information (e.g., the various signals discussed in the preceding paragraphs) from one device to another (e.g., from a sensor, to a transmitter, to a controller, to a control element, or to some combination of some or all of these). For example, the controller may be a device that converts a control signal into an equivalent air-pressure, electrical, pneumatic, or other output signal. This air-pressure, electrical, pneumatic or other output signal is sent from the controller to a control element that effects a change to the variable being manipulated. If the output signal is an air-pressure signal, the output signal will be transmitted to the control element via tubing. The control element, such as a pneumatic control valve, responds to the output signal by opening or closing, thus effecting the desired change to the variable being manipulated. The control system may include multiple valves: e.g., a two-valve system with one operating as a one-directional, open-or-shut valve and the other operating as a proportional valve. Alternatively, the output signal is converted into an electrical signal. The output signal is relayed to the control element via metal wire or other electrical conductor. The control element, such as an electronic control valve, responds to the electrical signal by opening or closing, thus effecting the desired change to the variable being manipulated.

An operator may input a value directly to the controller to produce a control signal. For example, an operator may adjust a dial or other input device on a pneumatic, hydraulic, electronic, or other controller to adjust the volumetric or mass flow rate of adhesive. The operator selects a setting on the input device of the controller corresponding to the flow rate desired by the operator. Typically the operator will have calibrated the input device on the controller so that input-device settings each correspond to specific volumetric or mass flow rate values.

A general-purpose computer may be used in place of, or in addition to, the controller mentioned above. Typically a general-purpose computer employs an input device, including, but not limited to, an alpha-numeric keyboard, mouse, joystick, stylus, touch screen, or some combination of these. Other devices which may be used to input data to the computer include, but are not limited to: devices for reading data stored on magnetic media such as 3.5 inch "floppy disks" or fixed-drives; devices for reading data stored on optical media, such as CD-ROMs; devices for reading data transmitted over cables, including optical cables; and devices for scanning and digitizing information on a document. In addition to the input devices like those mentioned above, a general-purpose computer usually includes a visual display for displaying data. Also, a general-purpose computer typically has a device for storing and retrieving data that is inputted to the computer. Devices for storing and retrieving data include, but are not limited to: a disk drive for reading data from, and storing data on, a 3.5 inch "floppy disk"; a hard disk or other fixed drive; a tape drive; or other device capable of reading data from, and storing data on, magnetic media.

A general-purpose computer may be adapted for use in controlling the volumetric or mass flow rate of adhesive. Typically a general-purpose computer comprises devices for data input, data storage, data processing, data display, and data output, as discussed above. For purposes of controlling volumetric or mass flow rate, the general-purpose computer may further comprise a set of instructions comprising the following steps: reading the control signal $M_1$, the control signal $M_1$ being transmitted to the computer in computer-readable form; correlating the control signal $M_1$ to an output signal $R_1$ and transmitting the output signal $R_1$ to a control element. The control element, such as an electronic, hydraulic, pneumatic, or other control valve, responds to the output signal $R_1$ by opening or closing, thus effecting the desired change to the variable being manipulated, in this volumetric or mass flow rate. Alternatively, the control element may effect desired changes to the speed at which a positive-displacement or other metering pump operates, thereby effecting desired changes to mass or volumetric flow rates.

The above discussion provides exemplars of equipment and methods for controlling the amount of adhesive being conducted to a point of application per unit time. It should be understood that other equipment and methods used to force adjust the flow rate of an adhesive of the present invention to a control set point, operator-inputted value, or other desired value falls within the scope of the present invention.

In accordance with the present invention as discussed above, the adhesive composition described herein is suitable for use in absorbent laminated structures and products such as a diapers, children's training pants, and other infant and child care products, adult incontinence garments and other adult care products, medical garments, sanitary napkins, and other feminine care products and the like, as well as surgical bandages and sponges. To further illustrate how the adhesive compositions of the present invention can be utilized in laminated structures and products, a diaper is illustrated below.

Figure 8:
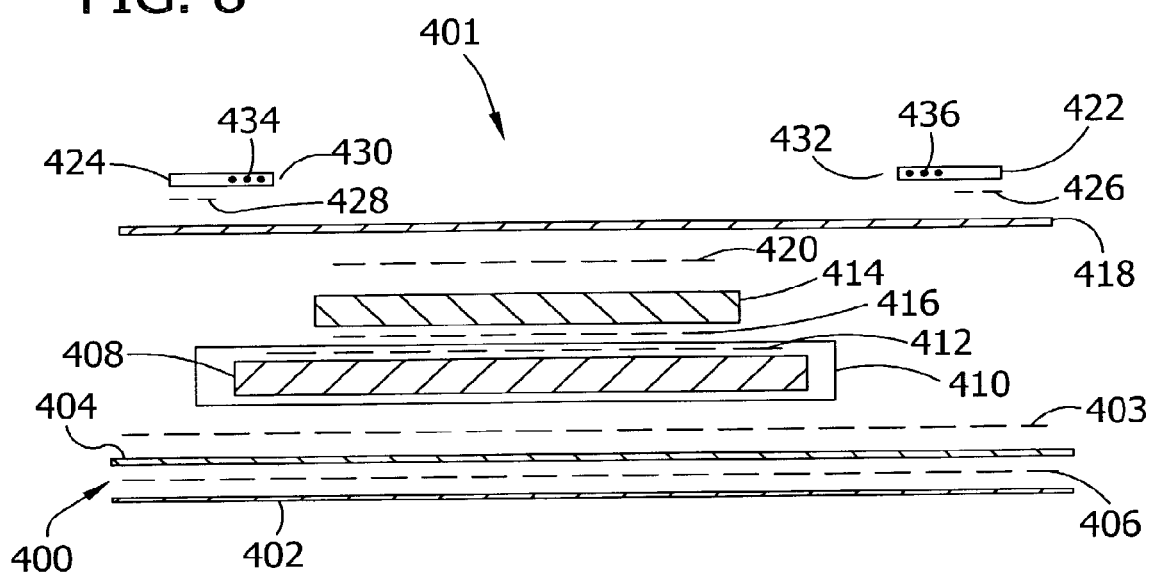
FIG. 8 is a cross sectional view of a diaper taken across line 8-8 of FIG. 10.
Figure 10:
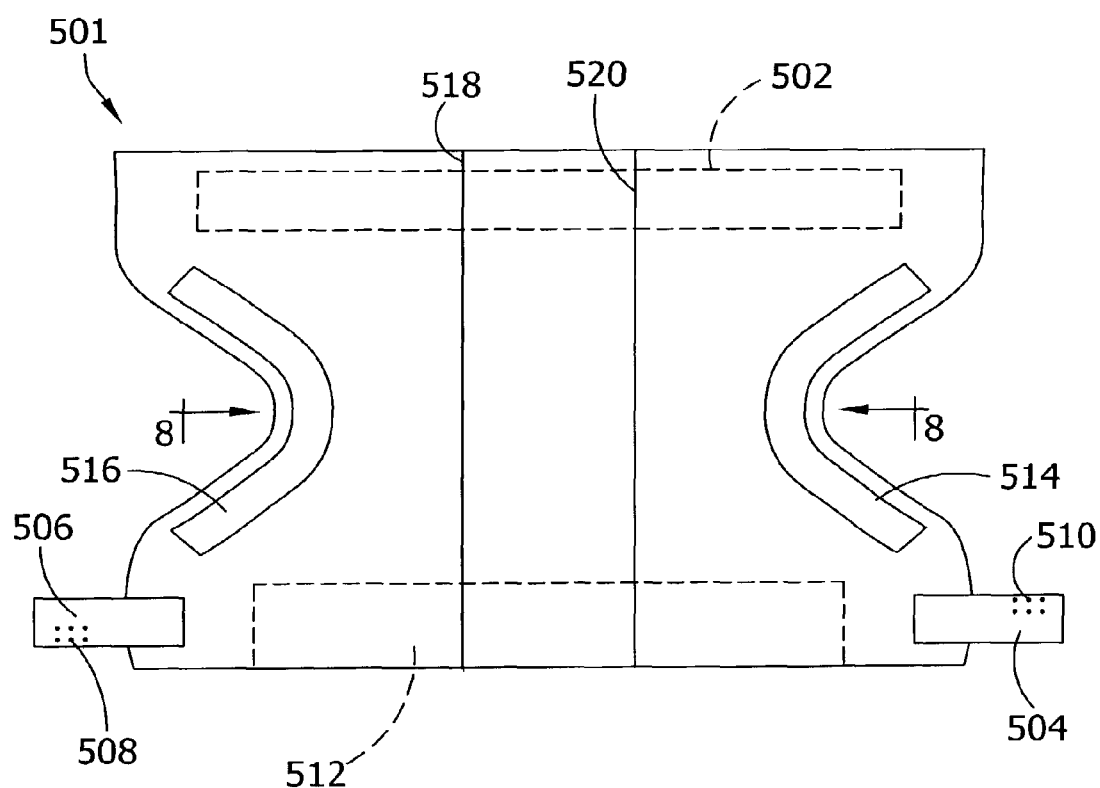
FIG. 10 is a top view of a diaper.

Referring now to FIG. 8, there is shown a cross-section of a diaper 401 along the line 8-8 of FIG. 10, which comprises generally an outercover 400 which comprises an outer layer 402 and an inner layer 404 adhesively bonded together with adhesive 406, which may be the adhesive composition of the present invention. The outer cover 400 is desirably stretchable and may or may not be somewhat elastic. As used herein, the term "stretchable" refers to a material that may be extensible and/or elastic. That is, the material may be extended, deformed or the like, without breaking, and may or may not significantly retract after removal of an extending force. As used herein, the term "elastic" refers to that property of a material where upon removal of an elongating force, the material is capable of substantially recovering its original size and shape or the material exhibits a significant retractive force. More desirably, the outer cover 400 is extensible such that once stretched under the weight of the insulted absorbent body, the outer cover will not retract substantially back toward its original position. As used herein, the term "extensible" refers to that property of a material where upon removal of an elongating force, the material experiences a substantially permanent deformation or the material does not exhibit a significant retractive force. For example, the outer cover 400 may be stretched approximately 25% to 150% beyond its original length with a relatively low force required to extend. More desirably, the outer cover 400 may be stretched approximately 50% to 100% beyond its original length and most desirably about 50% beyond its original length under a low stretching force. As a further example, in one embodiment a 25% elongation is achieved upon application of a force of in the range of about 30 g/in to about 200 g/in, more desirably between about 70 g/in and 150 g/in and most desirably about 100 g/in. It is also contemplated that the outer cover 400 may instead be generally non-extensible and remain within the scope of this invention.

The outer cover 400 can also be desirably constructed to support a selected hydrohead of water substantially without leakage therethrough. A suitable technique for determining the resistance of a material to liquid penetration is Federal Test Method Standard FTMS 191 Method 5514, 1978, or an equivalent thereof. Since the outer cover 400 can be extensible, a layer of nylon net material having a thickness of about 0.1 mm may be needed to support the outer cover material for this test. The net material may be provided by nylon threads arranged in a hexagonal or honeycomb-like pattern with openings approximately 4 mm across. For example, the net material may be purchased from Wal-Mart Stores under the trade designation T-246. The net material is liquid pervious and does not significantly affect the hydrohead values obtained. The extensible outer cover 400 is desirably sufficiently impermeable to liquid and semi-liquid materials to substantially prevent the undesired leakage of waste materials, such as urine and feces. For example, the extensible outer cover 400 can desirably support a hydrohead of at least about 45 centimeters (cm) substantially without leakage. The extensible outer cover 400 can alternatively support a hydrohead of at least about 55 cm, and optionally, can support a hydrohead of at least about 60 cm, or more, to provide improved benefits.

The extensible outer cover 400 can be composed of various materials which provide the desired properties set forth herein. For example, the extensible outer cover 400 is desirably composed of a neckable or otherwise necked fabric, but may instead, or may additionally, be composed of a creped fabric, a crimped fiber fabric, an extendable fiber fabric, a bonded-carded fabric, a micro-pleated fabric, polymer films or the like. The fabrics may be woven or nonwoven materials, such as spunbond fabrics.

As used herein, the term "neck" or "neck stretch" interchangeably means that a material is drawn such that it is extended under conditions reducing its width or its transverse dimension by drawing and elongating to increase the length of the fabric. The controlled drawing may take place under cool temperatures, room temperature or greater temperatures and is limited to an increase in overall dimension in the direction being drawn up to the elongation required to break the fabric. The necking process typically involves unwinding a sheet from a supply roll and passing it through a brake nip roll assembly driven at a given linear speed. A take-up roll or nip, operating at a linear speed higher than the brake nip roll, draws the fabric and generates the tension needed to elongate and neck the fabric. U.S. Pat. No. 4,965,122 entitled REVERSIBLY NECKED MATERIAL, by M. T. Morman which issued Oct. 23, 1990, the entire disclosure of which is hereby incorporated by reference in a manner consistent with the present document, discloses a process for providing a reversibly necked non-woven material which may include necking the material, then heating the necked material, followed by cooling.

As used herein, the term "neckable material or layer" means any material which can be necked such as a nonwoven, woven, or knitted material. The term "necked material" refers to any material which has been drawn in at least one dimension, (e.g. lengthwise), reducing the transverse dimension, (e.g. width), such that when the drawing force is removed, the material can be pulled back to its original width. The necked material typically has a higher basis weight per unit area than the un-necked material. When the necked material is pulled back to its original un-necked width, it should have about the same basis weight as the un-necked material. This differs from stretching/orienting a material layer, during which the layer is thinned and the basis weight is permanently reduced.

Typically, such necked nonwoven fabric materials are capable of being necked up to about 80 percent. For example, the extensible outer cover 400 may be composed of a material which has been necked from about 10 to about 80 percent, desirably from about 20 to about 60 percent, and more desirably from about 30 to about 50 percent for improved performance. For the purposes of the present disclosure, the term "percent necked" or "percent neckdown" refers to a ratio or percentage determined by measuring the difference between the pre-necked dimension and the necked dimension of a neckable material, and then dividing that difference by the pre-necked dimension of the neckable material and multiplying by 100 for percentage. The percent necked can be determined in accordance with the description in the above-mentioned U.S. Pat. No. 4,965,122.

The outer cover 400 is desirably a multi-layered laminate structure, and more desirably a necked, multi-layer laminate structure, to provide the desired levels of extensibility as well as liquid impermeability and vapor permeability. For example, the outer cover 400 of the illustrated embodiment is of two-layer construction, including an outer layer 402 constructed of a vapor and liquid permeable necked material and an inner layer 404 constructed of a liquid impermeable material, with the two layers being secured together by a suitable laminate adhesive 406, which as discussed further herein, can be the adhesive composition of the present invention. The outer cover may also be a single layer.

The liquid permeable outer layer 402 can be any suitable material as described above and is desirably one which provides a generally cloth-like texture. Suitable neckable materials for the outer layer 402 include non-woven webs, woven materials and knitted materials such as those described in the above-mentioned U.S. Pat. No. 4,965,122. Non-woven fabrics or webs have been formed from many processes, for example, bonded carded web processes, meltblowing processes and spunbonding processes. The non-elastic neckable material is desirably formed from at least one member selected from fibers and filaments of inelastic polymers. Such polymers include polyesters, for example, polyethylene terephthalate, polyolefins, for example, polyethylene and polypropylene, polyamides, for example, nylon 6 and nylon 66. A desirable material for the outer layer 402 of outer cover 400 is a spunbond polypropylene. These fibers or filaments are used alone or in a mixture of two or more thereof. Suitable fibers for forming the neckable material include natural and synthetic fibers as well as bicomponent, multi-component, and shaped polymer fibers.

Many polyolefins are available for fiber production including, for example, fiber forming polypropylenes include Exxon Chemical Company's Escorene PD 3445 polypropylene and Himont Chemical Company's PF-304. Polyethylenes such as Dow Chemical's ASPUN 6811A linear low density polyethylene, 2553 LLDPE and 25355 and 12350 high density polyethylene are also suitable polymers. The nonwoven web layer may be bonded to impart a discrete bond pattern with a prescribed bond surface area. If too much bond area is present on the neckable material, it will break before it necks. If there is not enough bond area, then the neckable material will pull apart. Typically, the percent bonding area useful in the present invention ranges from around 5 percent to around 40 percent of the area of the neckable material.

One particular example of suitable material from which the outer layer 402 may be constructed is a 0.4 osy (ounce per square yard) or 14 gsm (grams per square meter) spunbond polypropylene non-woven web which is neckable in the range of about 35% to 45%. Also, while it is not a necessity for the outer layer 402 of the outer cover 400 to be liquid permeable, it is desired that it have a cloth-like texture.

The liquid impermeable inner layer 404 of the outer cover 400 can be either vapor permeable (i.e., "breathable") or vapor impermeable. The inner layer 404 is desirably manufactured from a thin plastic film, such as a thin polypropylene film, although other flexible liquid impermeable materials may also be used. More particularly, the inner layer 404 can be made from either cast or blown film equipment, can be coextruded and can be embossed if so desired. It is understood that the inner layer 404 may otherwise be made from any suitable non-elastic polymer composition and may include multiple layers. Where the inner layer 404 is vapor permeable, it may contain such fillers as micropore developing fillers, e.g. calcium carbonate; opacifying agents, e.g. titanium dioxide; and antiblock additives, e.g. diatomaceous earth. Suitable polymers for the inner layer 404 include but are not limited to non-elastic extrudable polymers such as polyolefin or a blend of polyolefins, nylon, polyester and ethylene vinyl alcohol. More particularly, useful polyolefins include polypropylene and polyethylene. Other useful polymers include those described in U.S. Pat. No. 4,777,073 to Sheth, assigned to Exxon Chemical Patents Inc., such as a copolymer of polypropylene and low density polyethylene or linear low density polyethylene.

Alternative polymers for the inner layer 404 include those referred to as single site catalyzed polymers such as "metallocene" polymers produced according to a metallocene process and which have limited elastic properties. The term "metallocene-catalyzed polymers" as used herein includes those polymer materials that are produced by the polymerization of at least ethylene using metallocenes or constrained geometry catalysts, a class of organometallic complexes, as catalysts. For example, a common metallocene is ferrocene, a complex of a metal between two cyclopentadienyl (Cp) ligands. Such metallocene polymers are available from Exxon Chemical Company of Baytown, Tex. under the trade name EXXPOL® for polypropylene based polymers and EXACT® for polyethylene based polymers and from Dow Chemical Company of Midland, Mich. under the name ENGAGE®. Desirably, the metallocene polymers are selected from copolymers of ethylene and 1-butene, copolymers of ethylene and 1-hexene, copolymers of ethylene and 1-octene and combinations thereof.

The inner layer 404 may be laminated to the neckable material of the outer layer 402 to form the laminate outer cover 400 utilizing the adhesive compositions of the present invention or by conventional methods known in the art including adhesive bonding, point bonding, thermal point bonding, and sonic welding. The outer cover 400 is then necked by conventional necking processes which typically vary the surface speed of the web to draw or neck the laminate. Such necking provides striated rugosities in the film and/or laminate resulting in transverse extensibility and retractability to the necked laminate and more "cloth-like" aesthetics. It is known that stretching and orienting a filled film layer (e.g., inner layer 404) causes micropores to form in the film, but longitudinal striated rugosities do not typically form in the film layer when stretched. The film layer would instead become physically thinner and may narrow slightly. By necking the laminate, the non-elastic neckable material, which is attached to the non-elastic film layer, will neck and bring the non-elastic film layer with it, thereby forming the longitudinal striated rugosities in the film which allow the film layer to extend in the transverse direction.

Alternative necked laminate materials that could be used to provide the outer cover 400 with the desired extensibility and liquid impermeability are described in U.S. patent application Ser. No. 09/460,490 filed Dec. 14, 1999 and entitled "BREATHABLE LAMINATE PERMANENTLY CONFORMABLE TO THE CONTOURS OF A WEARER", the entire disclosure of which is hereby incorporated by reference in a manner consistent with the present document. Other suitable necked laminates that include at least one non-elastic neckable material laminated to at least one non-elastic film material are described in U.S. patent application Ser. No. 09/455,513 filed Dec. 6, 1999 and entitled "TRANSVERSELY EXTENSIBLE AND RETRACTABLE NECKED LAMINATE OF NON-ELASTIC SHEET LAYERS", the entire disclosure of which is hereby incorporated by reference in a manner consistent with the present document. However, it is to be understood that the laminate outer cover need not be composed of a neckable or necked material to be useful with the adhesive compositions of the present invention.

Referring now to FIG. 10, diaper 501 also includes a loop material or "pub patch" 502 adhesively bound to the outer cover for receiving hook material for fastening or closing the diaper during wear. The adhesive composition utilized to bond the pub patch to the outer cover may comprise the adhesive compositions of the present invention. The loop material may include a nonwoven fabric having continuous bonded areas defining a plurality of discrete unbonded areas. The fibers or filaments within the discrete unbonded areas of the fabric are dimensionally stabilized by the continuous bonded areas that encircle or surround each unbonded area, such that no support or backing layer of film or adhesive is required. The unbonded areas are specifically designed to afford spaces between fibers or filaments within the unbonded area that remain sufficiently open or large to receive and engage hook elements of the complementary hook material. In particular, a pattern-unbonded nonwoven fabric or web may include a spunbond nonwoven web formed of single component or multi-component melt-spun filaments. For example, the pub patch may be formed from a laminated structure including a polyethylene component and a polypropylene component adhesively bonded together and the polypropylene component is outwardly facing to accept a hook-type fastener.

At least one surface of the nonwoven fabric can include a plurality of discrete, unbonded areas surrounded or encircled by continuous bonded areas. The continuous bonded areas dimensionally stabilize the fibers or filaments forming the nonwoven web by bonding or fusing together the portions of the fibers or filaments that extend outside of the unbonded areas into the bonded areas, while leaving the fibers or filaments within the unbonded areas substantially free of bonding or fusing. The degree of bonding or fusing within the bonding areas desirably is sufficient to render the nonwoven web non-fibrous within the bonded areas, leaving the fibers or filaments within the unbonded areas to act as "loops" for receiving and engaging hook elements. Examples of suitable point-unbonded fabrics are described in U.S. Pat. No. 5,858, 515 entitled PATTERN-UNBONDED NONWOVEN WEB AND PROCESS FOR MAKING THE SAME, by T. J. Stokes et al., the entire disclosure of which is incorporated herein by reference in a manner that is consistent with the present document.

Referring again to FIG. 8, diaper 401 additionally comprises an absorbent core 408 which can be adhesively bonded to a tissue wrap 410 (also commonly referred to as a tissue wrap sheet) by adhesive 412 which can be the adhesive composition of the present invention. Alternatively, the absorbent core need not have a tissue wrap and can simply be sandwiched between the outer cover and the bodyside liner. Absorbent core 408 may have any of a number of shapes, including rectangular, I-shaped, or T-shaped and is desirably narrower in the crotch region than in the front or back regions of the diaper 401. The size and the absorbent capacity of absorbent core 408 will be selected according to the size of the intended wearer and the liquid loading imparted by the intended use of the diaper. Further, the size and the absorbent capacity of the absorbent core 408 can be varied to accommodate various sized wearers. In addition, it has been found that the densities and/or basis weights of the absorbent core 408 can be varied. In the embodiment described herein, the absorbent core 408 typically has an absorbent capacity of at least about 300 grams of synthetic urine.

The absorbent core 408 desirably includes hydrophilic fibers and superabsorbent particles, as described more fully below. Various types of wettable, hydrophilic fibrous material can be used to make the absorbent core 408. Examples of suitable fibers include naturally occurring organic fibers composed of intrinsically wettable material, such as cellulosic fibers; synthetic fibers composed of cellulose or cellulose derivatives, such as rayon fibers; inorganic fibers composed of an inherently wettable material, such as glass fibers; synthetic fibers made from inherently wettable thermoplastic polymers, such as particular polyester or polyamide fibers; and synthetic fibers composed of a nonwettable thermoplastic polymer, such as polypropylene fibers, which have been hydrophilized by appropriate means. The fibers may be hydrophilized, for example, by treatment with silica, treatment with a material which has a suitable hydrophilic moiety and is not readily removable from the fiber, or by sheathing the nonwettable, hydrophobic fiber with a hydrophilic polymer during or after the formation of the fiber. For the purposes of the present invention, it is contemplated that selected blends of the various types of fibers mentioned above may also be employed.

The absorbent core 408 may include a combination of hydrophilic fibers and high-absorbency material. However, it is understood that absorbent bodies having absorbent layers of other compositions and having dimensions other than described may be used without departing from the scope of the present invention. More specifically, the high-absorbency material in absorbent core 408 can be selected from natural, synthetic, and modified natural polymers and materials. The high-absorbency materials can be inorganic materials, such as silica gels, or organic compounds, such as crosslinked polymers. The term "crosslinked" refers to methods for effectively rendering normally water-soluble materials substantially water insoluble but swellable. Such methods include, for example, physical entanglement, crystalline domains, covalent bonds, ionic complexes and associations, hydrophilic associations such as hydrogen bonding, and hydrophobic associations or Van der Waals forces.

Examples of synthetic, polymeric, high-absorbency materials include the alkali metal and ammonium salts of poly (acrylic acid) and poly(methacrylic acid), poly(acrylamides), polyvinyl ethers), maleic anhydride copolymers with vinyl ethers and alpha-olefins, poly(vinyl pyrrolidone), polyvinyl morpholinone), poly(vinyl alcohol), and mixtures and copolymers thereof. Further polymers suitable for use in absorbent core 408 include natural and modified natural polymers, such as hydrolyzed acrylonitrile-grafted starch, acrylic acid grafted starch, methyl cellulose, carboxymethyl cellulose, hydroxypropyl cellulose, and the natural gums, such as alginates, xanthan gum, locust bean gum, and the like. Mixtures of natural and wholly or partially synthetic absorbent polymers can also be useful in the present invention.

The high absorbency material may be in any of a wide variety of geometric forms. As a general rule, it is desirable that the high absorbency material be in the form of discrete particles or beads. However, the high absorbency material may also be in the form of fibers, flakes, rods, spheres, needles, or the like. In general, the high absorbency material is present in the absorbent core 408 in an amount of from about 5 to about 90 percent by weight, desirably in an amount of at least about 30 percent by weight, and even more desirably in an amount of at least about 50 percent by weight based on a total weight of absorbent core 408.

An example of high-absorbency material suitable for use in the absorbent core 408 is SANWET IM 3900 polymer available from Hoechst Celanese, a business having offices in Portsmouth, Va. Other suitable superabsorbents may include FAVOR SXM 880 polymer obtained from Stockhausen, a business having offices in Greensboro, N.C.

As discussed above, absorbent core 408 can be wrapped in tissue wrap 410, and adhesively bonded thereto with adhesive 412, which may be the adhesive composition of the present invention. Tissue wrap 410 is a substantially hydrophilic tissue wrap employed to help maintain the integrity of the structure of absorbent core 408 and to stabilize absorbent core 408. Tissue wrap 410 can be made of an absorbent cellulosic material, such as creped wadding or a high wet-strength tissue. Tissue wrap 410 can be configured to provide a wicking layer that helps to rapidly distribute liquid over the mass of absorbent fibers constituting the absorbent core 408.

Tissue wrap 410 can be adhesively bonded to surge management layer 414 with adhesive 416, which may be the adhesive composition of the present invention. Surge management layer 414 is typically less hydrophilic than the absorbent core 408 and has an operable level of density and basis weight to quickly collect and temporarily hold liquid surges, to transport the liquid from its initial entrance point and to substantially completely release the liquid to the absorbent core. This configuration is intended to minimize the likelihood of the liquid from pooling and collecting on the portion of the diaper against the wearer's skin, thereby reducing the feeling of wetness by the wearer. The structure of the surge management layer 414 also generally enhances the air exchange within the diaper 401.

Various woven and nonwoven fabrics can be used to construct the surge management layer 414. For example, the surge management layer 414 may be a layer made of a meltblown or spunbond web of synthetic fibers, such as polyolefin fibers. The surge management layer 414 may also be a bonded-carded-web or an airlaid web composed of natural and synthetic fibers. The bonded-carded-web may, for example, be a thermally bonded web that is bonded using low melt binder fibers, powder or adhesive. The webs can optionally include a mixture of different fibers. The surge management layer 414 may be composed of a substantially hydrophobic material, and the hydrophobic material may optionally be treated with a surfactant or otherwise processed to impart a desired level of wettability and hydrophilicity. As one example, the surge management layer 414 includes a hydrophobic, nonwoven material having a basis weight of from about 30 to about 120 grams per square meter.

The absorbent core 408 is typically positioned in liquid communication with the surge management layer 414 to receive liquids released from the surge management layer, and to hold and store the liquid. In the illustrated embodiment, the surge management layer 414 is a separate layer positioned over the absorbent core 408. The surge management layer 414 serves to quickly collect and temporarily hold discharged liquids, to transport such liquids from the point of initial contact and spread the liquid to other parts of the surge management layer 414, and then to substantially completely release such liquids into the absorbent core 408.

The surge management layer 414 can be of any desired shape. Suitable shapes include for example, circular, rectangular, triangular, trapezoidal, oblong, dog-boned, hourglass-shaped, or oval.

Additional materials suitable for the surge management layer 414 are set forth in U.S. Pat. No. 5,486,166 issued Jan. 23, 1996 in the name of C. Ellis et al. and entitled "FIBROUS NONWOVEN WEB SURGE LAYER FOR PERSONAL CARE ABSORBENT ARTICLES AND THE LIKE"; U.S. Pat. No. 5,490,846 issued Feb. 13, 1996 in the name of Ellis et al. and entitled "IMPROVED SURGE MANAGEMENT FIBROUS NONWOVEN WEB FOR PERSONAL CARE ABSORBENT ARTICLES AND THE LIKE"; and U.S. Pat. No. 5,364,382 issued Nov. 15, 1994 in the name of Latimer et al. and entitled "ABSORBENT STRUCTURE HAVING IMPROVED FLUID SURGE MANAGEMENT AND PRODUCT INCORPORATING SAME", the disclosures of which are hereby incorporated by reference in a manner consistent with the present document.

The surge management layer 414 is adhesively bonded to the bodyside liner 418 with adhesive 420. The adhesive 420 may be the adhesive composition of the present invention. The bodyside liner 418 is generally bonded to the inner layer 404 of outer cover 400 with adhesive 403 and is desirably pliable, soft feeling, and nonirritating to the wearer's skin, and is employed to help isolate the wearer's skin from the absorbent core 408. The bodyside liner 418 is less hydrophilic than the absorbent core 408, to present a relatively dry surface to the wearer, and is sufficiently porous to be liquid permeable, permitting liquid to readily penetrate through its thickness. A suitable bodyside liner 418 may be manufactured from a wide selection of web materials, but is desirably capable of stretching in at least one direction (e.g., longitudinal or lateral). Various woven and nonwoven fabrics including either or both synthetic and natural fibers can be used for the bodyside liner 418. For example, the bodyside liner 418 may be composed of a meltblown or spunbonded web of the desired fibers, and may also be a bonded-carded-web. Layers of different materials that may have different fiber deniers can also be used. The various fabrics can be composed of natural fibers, synthetic fibers or combinations thereof. For example, the bodyside liner may comprise a spunbonded polypropylene.

The bodyside liner 418 may be composed of a substantially hydrophobic material, and the hydrophobic material may optionally be treated with a surfactant or otherwise processed to impart a desired level of wettability and hydrophilicity. Examples of suitable materials for the bodyside liner 418 include 0.3-0.5 osy (10-17 gsm) polypropylene spunbond web treated with a suitable wettability treatment, 0.3-0.5 osy (10-17 gsm) bonded carded web and 0.4-0.8 osy (14-27 gsm) thru air bonded carded web. The fabric can be surface treated with an operative amount of surfactant, such as about 0.28 percent Triton X-102 surfactant. The surfactant can be applied by any conventional means, such as spraying, printing, brush coating or the like.

In particular embodiments, the bodyside liner 418 is desirably extensible and capable of extending along with the outer cover 400 for desired fit of the diaper on the wearer. For example, the bodyside liner 418 can be composed of various extensible materials such as a necked fabric, a creped fabric, a micro-pleated fabric, perforated polymer films or the like, as well as combinations thereof. The fabrics may be woven or nonwoven materials, such as spunbond fabrics, that may be elastic or non-elastic. Examples of suitable manufacturing techniques and suitable necked nonwoven fabric materials for such an extensible bodyside liner 418 are described in U.S. Pat. No. 4,965,122 entitled REVERSIBLY NECKED MATERIAL, by M. T. Morman which issued Oct. 23, 1990.

Desirably, the bodyside liner 418 is made from non-elastic neckable materials for reduced cost and improved manufacturing efficiency. Suitable non-elastic neckable materials for such a configuration include nonwoven webs, woven materials and knitted materials. Such webs can include one or more fabric layers. Nonwoven fabrics or webs have been formed from many processes, for example, bonded carded web processes, meltblowing processes and spunbonding processes. The non-elastic neckable material is desirably formed from at least one member selected from fibers and filaments of inelastic polymers. Such polymers include polyesters, for example, polyethylene terephthalate, polyolefins, for example, polyethylene and polypropylene, polyamides. These fibers or filaments are used alone or in a mixture of two or more thereof. Suitable fibers for forming the neckable material include natural and synthetic fibers as well as bicomponent, multi-component, and shaped polymer fibers. Many polyolefins are available for fiber production according to the present invention, for example, fiber forming polypropylenes include Exxon Chemical Company's Escorene PD 3445 polypropylene and Himont Chemical Company's PF-304. Polyethylenes such as Dow Chemical's ASPUN 6811A linear low density polyethylene, 2553 LLDPE and 25355 and 12350 high density polyethylene are also suitable polymers.

The neckable material may be necked to form the extensible bodyside liner 418 by conventional necking processes which typically vary the surface speed of the web to draw or neck the material. Such necking will allow the material to extend and retract in the transverse direction. As discussed above, such necked non-woven fabric materials typically are capable of being necked up to about 80 percent. For example, the extensible bodyside liner 418 may be necked from about 10 to about 80 percent, more desirably from about 20 to about 60 percent, and still more desirably from about 30 to about 50 percent for improved performance.

Figure 9:
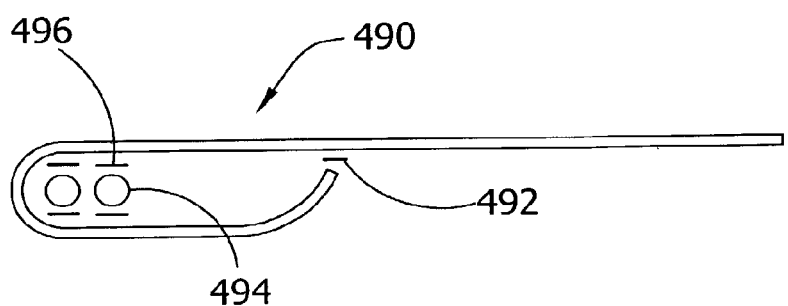
FIG. 9 is a cross sectional view of a containment flap.

Containment flaps 422 and 424 may be bonded to the outer cover, bodyside liner, or other intermediate layer. In the illustrated embodiment, the flaps are bonded directly to the bodyside liner 418 using with adhesive 426 and 428. A suitable adhesive composition for bonding the containment flaps to the bodyside liner includes the adhesive composition of the present invention. Typically, the containment flaps are first formed outside of the diaper manufacturing process and subsequently introduced into the manufacturing process for attachment to the bodyside liner. As illustrated in FIG. 9, the containment flap 490 is formed off-line by folding the construction material for the containment flap 490 over onto itself and securing it with adhesive 492, which may be an adhesive composition of the present invention. The folding over of the material traps a stretchable material 494, secured to the containment flap 490 with adhesive 496, within the containment flap. Adhesive 496 can be the adhesive composition of the present invention.

Referring again to FIG. 8, containment flaps 422 and 424 are configured to provide a barrier to the lateral flow of body exudates, and generally include a spunbond polypropylene and LYCRA or other stretchable material. Each containment flap typically has a free, or unattached end 430 and 432 free from connection with the bodyside liner 418 and other components of the diaper 401. Elastic strands (stretchable material) 434 and 436 disposed within the containment flaps 422 and 424 adjacent the unattached ends thereof urge the flaps toward an upright, perpendicular configuration in at least the crotch region of the diaper 401 to form a seal against the wearer's body when the diaper is worn. The containment flaps 422 and 424 may extend longitudinally the entire length of the absorbent core 408 or they may extend only partially along the length of the absorbent core 408. When the containment flaps 422 and 424 are shorter in length than the absorbent core 408, the flaps can be selectively positioned anywhere between the side edges of the diaper and the crotch region of the diaper. In a particular aspect, the containment flaps 422 and 424 extend the entire length of the absorbent core 408 to better contain the body exudates. Containment flaps are generally well known to those skilled in the art. For example, suitable constructions and arrangements for containment flaps are described in U.S. Pat. No. 4,704,116 issued Nov. 3, 1987 to K. Enloe, the disclosure of which is hereby incorporated by reference in a manner consistent with the present document.

Referring now to FIG. 10, there is shown containment flaps 518 and 520 and ears 504 and 506 (also commonly referred to as tabs or side panels) which are adhesively attached to diaper 501. The adhesive, which attaches the ears to the diaper, may be the adhesive composition of the present invention. Typically, the ears 504 and 506 are separately formed and attached to the outer cover, to the bodyside liner, between the outer cover and the bodyside liner, or to other suitable components of the diaper. The ears 504 and 506 may be elastic or otherwise rendered elastomeric. For example, the ears 504 and 506 may be an elastomeric material such as a neck-bonded laminate (NBL) or stretch-bonded laminate (SBL) material. Methods of making such materials are well known to those skilled in the art and are described in U.S. Pat. No. 4,663,220 issued May 5, 1987 to Wisneski et al., U.S. Pat. No. 5,226,992 issued Jul. 13, 1993 to Morman, and European Patent Application No. EP 0 217 032 published on Apr. 8, 1987 in the names of Taylor et al., the disclosures of which are hereby incorporated by reference in a manner consistent with the present document. Examples of articles that include elasticized side panels and selectively configured fastener tabs are described in U.S. Pat. No. 5,496,298 issued Mar. 5, 1996 to Kuepper et al.; U.S. Pat. No. 5,540,796 to Fries; and U.S. Pat. No. 5,595,618 to Fries; the disclosures of which are also incorporated herein by reference in a manner consistent with the present document. Alternatively, the ears 504 and 506 may be formed integrally with a selected diaper component. For example, the ears 504 and 506 can be integrally formed with the inner or outer layer of the outer cover or may be integrally formed from with the bodyside liner.

Fastening components, such as hook fasteners 508 and 510 are typically employed on the ears 504 and 506 to secure the diaper 501 on the body of a child or other wearer by connecting the ears 504 and 506 to the pub patch (loop fastener) previously described. The hook fasteners 508 and 510 are adhesively bonded to the ears 504 and 506. A suitable adhesive includes the adhesive compositions of the present invention. Alternatively, other fastening components (not shown), such as buttons, pins, snaps, adhesive tape fasteners, cohesives, mushroom-and-loop fasteners, or the like, may be employed. Desirably, the interconnection of the fastening components is selectively releasable and re-attachable. In the illustrated embodiment, the hook fasteners 508 and 510 are attached to and extend laterally out from the respective ears 504 and 506 at the back region of the diaper 501.

To provide improved fit and to help further reduce leakage of body exudates from the diaper 501, elastic components are typically incorporated into the diaper 501, particularly at the waist area and the leg areas. For example, as illustrated in FIG. 10, the diaper 501 has a waist elastic component 512 and leg elastics 514 and 516. The waist elastic 512 is configured to gather and shirr the end margins of the diaper 501 to provide a resilient, comfortable close fit around the waist of the wearer.

The leg elastic components are typically secured between the outer and inner layers of the outer cover, such as by being bonded to one or both layers by a laminate adhesive, such as the adhesive composition of the present invention. It should be understood, however, that the leg elastic components may be secured between the outer and inner layers of the outer cover by other methods.

Each elastic component generally comprises an elongate substrate, such as a sheet or ribbon, having threads or strands of elastic material secured to the substrate in generally parallel, spaced relationship with each other. As an example, one suitable elastic material from which the elastic strands may be constructed is a dry-spun coalesced multi-filament elastomeric thread sold under the trade name LYCRA and available from E.I. du Pont de Nemours (Wilmington, Del.). The elastic strands are desirably secured to the substrate while in a stretched condition such that the retractive forces of the elastic strands tend to gather the substrate. The substrate is in turn secured between the outer and inner layers of the outer cover with the substrate ungathered such that the retrative forces of the elastic strands gather the diaper at the leg openings to provide a snug fit around the wearer's leg. The various components of the diaper 501 are integrally assembled together using a suitable form of attachment, such as a combination of adhesives, sonic bonds, thermal bonds.

Examples of other diaper configurations suitable for use in connection with the instant application that may or may not include diaper components similar to those described previously are described in U.S. Pat. No. 4,798,603 issued Jan. 17, 1989, to Meyer et al.; U.S. Pat. No. 5,176,668 issued Jan. 5, 1993, to Bernardin; U.S. Pat. No. 5,176,672 issued Jan. 5, 1993, to Bruemmer et al.; U.S. Pat. No. 5,192,606 issued Mar. 9, 1993, to Proxmire et al., and U.S. Pat. No. 5,509,915 issued Apr. 23, 1996 to Hanson et al., the disclosures of which are hereby incorporated by reference in a manner consistent with the present document.

As is evident from the above-description of the diaper manufacturing process, hot melt adhesives are commonly utilized throughout the process to hold numerous components together on the production line and to bond numerous components together. One substantial shortcoming of conventional hot-melt adhesives that is overcome with the adhesive compositions of the present invention is that different types of conventional hot-melt adhesives must be used in the diaper manufacturing process depending upon what type of bond is being made, or the position of the bond in the disposable product. For example, where the bonded materials are required to be stretchable or pliable, a crepe-resistant type hot-melt adhesive must be utilized to provide as much stretchability and pliability in the bonded joint as possible. Where stretchability and pliability is not required, a conventional construction adhesive can be utilized to form the bond. This distinction in conventional hot-melt adhesives mandates more manufacturing equipment and a more complex manufacturing line, which may be prone to more frequent breakdowns. With the adhesive compositions of the present invention, a single adhesive composition can be utilized throughout the entire manufacturing process, which significantly simplifies the process and reduces costs as only a single adhesive source need be maintained. Further, as mentioned above, the cost of the adhesive compositions of the present invention is typically less than conventional construction hot-melt adhesives, and substantially less than crepe resistant adhesives.

Another significant advantage that the adhesive compositions of the present invention provide is that they are stable over extended periods of time in disposable absorbent products, will not significantly discolor or add any additional odor, and will not adversely react with human skin upon use. Conventional adhesives that may be present in certain absorbent products tend to discolor over time and may turn a yellowish or yellowish brown color causing an unwanted yellowish or brownish tint to the product. Additionally, such adhesives may cause adverse skin reactions in sensitive individuals upon contact with skin. Because diapers are typically white in color, discoloration due to the use of conventional hot-melt adhesives is particularly troublesome as it significantly decreases consumer appeal for the product, which begins to look dirty and old. Also, adverse skin reactions due to the contacting of the conventional hot-melt adhesives with skin can be troublesome in some individuals. This contact with skin can be the result of overspray as discussed below, or can be the result of adhesive "bleedthrough," or a soaking through effect of the adhesive through the material to which it is applied and may cause the product to stick to the skin of the wearer. The adhesive compositions of the present invention are highly stable compounds which will not substantially react with skin and resist discoloration and provide diapers with enhanced consumer appeal as the diapers tend to retain their original colorings. Also, bleedthrough is reduced with the adhesive compositions described herein as these adhesives are much less likely to bleedthrough upon the application of heat in the manufacturing process.

One significant advantage provided by the adhesive compositions of the present invention as compared to conventional hot-melt adhesives is the ability of bonded areas on a laminated product to have significant stretch with improved overall strength. When conventional hot-melt adhesives are utilized in bonding two stretchable substrates, the resulting bonded area or joint is typically "locked up," or provides only minimal stretching due to the presence of the hot-melt adhesive, even when crepe-resistant type adhesives are utilized. In contrast, when the adhesive compositions of the present invention are utilized in bonding two stretchable substrates, there is significant stretch in the bonded joint and the flexibility and strength of the joint is improved. For example, when a polypropylene adhesive composition as described herein is used to bond together two stretchable polypropylene faced laminations, the resulting bonded joint possesses significant stretch, flexibility, and strength. This is important in disposable absorbent articles where the stretching, flexibility, and strength of joints is important for proper fit and comfort of the wearer.

In addition to the substantial benefits described above, the adhesive compositions of the present invention simplify the manufacturing process of disposable absorbent articles. The process is simplified in one manner because the novel adhesive compositions described herein posses no tack after the adhesive is set which greatly reduces/eliminates machine contamination. Conventional hot-melt adhesives typically have a long open time; that is, conventional hot-melt adhesives typically remain tacky for a substantial period of time after application to a substrate. This long open time may complicate the manufacturing process as overspray, or the application of adhesive in areas immediately surrounding the intended target area which is a common problem in manufacturing, can lead to the unwanted sticking together of various components of the laminated absorbent product and complication of the manufacturing process. Also, the unavoidable overspray of conventional hot-melt adhesives can lead to skin irritation in sensitive individuals as discussed above. The adhesive compositions of the present invention have a very short open time and thus are less likely to cause unwanted sticking of components in a laminated product. Also, the adhesive compositions of the present invention are substantially inert with respect to skin and thus any overspray which remains on the absorbent product is not a significant cause of concern.

Additionally, the manufacturing process of disposable absorbent products such as diapers is simplified by the adhesive compositions described herein as these adhesive compositions are easy to work with and handle, and do not posses a high level of "stickyness." Conventional hot-melt adhesives typically are melted from a solid to a liquid prior to use and thus it is required that the solid hot-melt adhesives be handled and loaded into a heating apparatus. These conventional adhesives are very sticky to handle, and require a coating of powder on their surface to allow easy handling. No such powderous coating is required with the adhesive compositions of the present invention. These adhesives do not have a sticky feel on their surface, and can be easily handled without the aid of a powderous coating.

The novel adhesive compositions of the present invention can be utilized throughout a laminated absorbent product, such as a diaper, as a replacement for all conventional hot-melt adhesives, including both crepe-resistant and construction adhesives, in the construction of the product. As noted above, adhesive compositions are used numerous times in the construction of a laminated absorbent product. The adhesives are typically present on numerous components of the absorbent product due to the transferring of materials along the assembly line, and may be utilized solely for bonding certain components together in some circumstances. The novel adhesive compositions described herein can easily replace these adhesives, as mentioned above. For example, the adhesive compositions of the present invention can be used for bonding the following components of a diaper during an in-line manufacturing process: containment flaps to bodyside liner; waist elastic to bodyside liner; leg elastic to outer cover; pub patch to outer cover; outer cover to absorbent core; surge layer to absorbent core; tissue wrap to absorbent core; bodyside liner to outer cover; ears to bodyside liner; and containment flaps to bodyside liner.

Additionally, the novel adhesive compositions of the present invention can be utilized in place of conventional hot-melt adhesives in the formation of components ultimately utilized in a laminated absorbent product. As mentioned above, numerous components may be made off-line and subsequently introduced into the manufacturing process of a laminated disposable absorbent product. Such components, which can utilize the adhesive compositions of the present invention in place of the traditional hot-melt adhesives, include, for example, a containment flap assembly where a part of the component is folded over itself, ear pieces where hook material may be bonded to a polypropylene substrate, and the outer cover assembly which may consist of an outer layer and an inner layer as described above.

The novel adhesive compositions of the present invention may be introduced onto one or more components of a laminated absorbent product in numerous patterns well known to those skilled in the art. For example, the adhesive compositions may be laid in swirl patterns, slot coated patterns, air laid or spot coated patterns and/or continuous bead line patters. As one skilled in the art will realize, some patterns may be more desired with certain materials.

In another embodiment of the present invention, the adhesive compositions described herein can be utilized as material basis weight increasing agents to increase the material basis weight and improve the overall strength and durability of one or more components or zones of a disposable laminated absorbent garment; that is, the adhesive compositions may be used to increase the material basis weight of a specific section or portion of one or more components of a laminated product, or a specific zone of the product, to provide increased material strength in a specific region of the resulting product as opposed to using a thicker starting material. For example, a material basis weight increasing agent of the present invention may be introduced onto a specific zone of a component of a disposable absorbent article, such as an attachment zone, to provide increased strength in that zone upon subsequent manufacturing or use of the product. In this embodiment, an increased amount of material basis weight increasing agent is typically utilized to increase the material basis weight as compared to when the adhesive composition is used solely as a bonding agent as discussed above. As discussed more fully below, the adhesive compositions described herein can also serve a dual function of acting as a bonding agent and a material basis weight increasing agent.

As is evident from the above discussion and known to those skilled in the art, it is typically desirable to utilize thin materials as components when manufacturing disposable laminated absorbent products such that a thin disposable product is produced; that is, it is typically desirable to use materials with small basis weights, generally from about 0.2 osy to about 0.8 osy, and desirably from about 0.2 osy to about 0.6 osy. The reasons for this are severalfold, with the primary reason being cost considerations. When thinner materials are utilized to construct laminated absorbent products, significant cost savings on raw materials can be realized. Additionally, thinner materials generally result in improved flexibility of the resulting product, and improved fit on the wearer. This improved flexibility and fit can result in a more comfortable product with a reduced risk of leaking, and hence a more consumer-friendly product.

Along with cost and flexibility, thinner materials also typically allow for improved breathability of the resulting product. Products with a high degree of breathability are desirable as hot, moist air contained within the product after soiling of the product can be exchanged with the air outside of the product allowing fresh, cool air inside of the product. This results in a more comfortable product for the wearer, and may also improve overall skin health of the wearer by reducing skin over-hydration. Additionally, thinner materials will typically allow leg and waist elastics to perform better such that leakage from the product is minimized. This occurs due to the fact that with thinner materials, the elastic portions of the leg and waist bands do not have to move as much material and perform more efficiently.

Moreover, thinner materials allow for improving packaging as the resulting package containing the product is thinner, and easier to handle and cheaper to transport. This is a direct result of an improvement in the folding and bending characteristics of the absorbent products when thinner materials are used to construct the product. Also, thinner packages have significant consumer appeal as they are easier to transport and do not look as bulky as conventionally packaged absorbent products.

Although it is generally desirable to utilize thin materials during manufacture of laminated disposable absorbent products as discussed above, such thin materials can lead to numerous problems during manufacturing and use of the product. Various bond types, such as ultrasonic bonds, thermal bonds, tape bonds, and snap or rivot type fasteners, can fail during manufacturing or use due to the failure of thin components. Also, as mentioned, adhesive bleedthrough can be a problem. For example, an ultrasonic bond may cause material failure during manufacturing due to the hammer/anvil combination pushing through or puncturing the material causing it to tear, fracture, and/or shread such that the bond fails and the product is not useable. This is typically a direct result of the material being too thin to allow for the formation of the bond. Similar problems can arise with the other types of bonds and fasteners.

In accordance with one embodiment of the present invention, the material basis weight increasing agents described herein, such as a mixture of atactic and isotactic polypropylene, can be utilized on a specific region of a product, or on a portion of a component of a disposable laminated absorbent product, to increase the material basis weight, and hence the strength, of the treated component such that is it much less likely to fail during manufacture when bonding is performed in the area containing the adhesive composition, or during consumer use. In this embodiment, the material basis weight increasing agent is selectively added to a specific region of a component, or the entire component, to increase the material basis weight of that region such that the strength and durability are improved and the component is more resistant to the stress and shear forces imparted thereon during manufacture and bonding. The material basis weight increasing agent utilized to increase the material basis weight and the strength of the component may be applied in-line, that is during the manufacturing process, or may be applied off-line in a separate process prior to the introduction of the treated component into the manufacturing process. The adhesive compositions of the present invention act to increase the strength of the treated area by allowing a distribution of force along the entire treated area such that the strength of the area is increased. This embodiment of the present invention allows for an increase in material strength where needed to improve product performance without the need to use a thicker starting material which could significantly increase costs.

Figure 11:
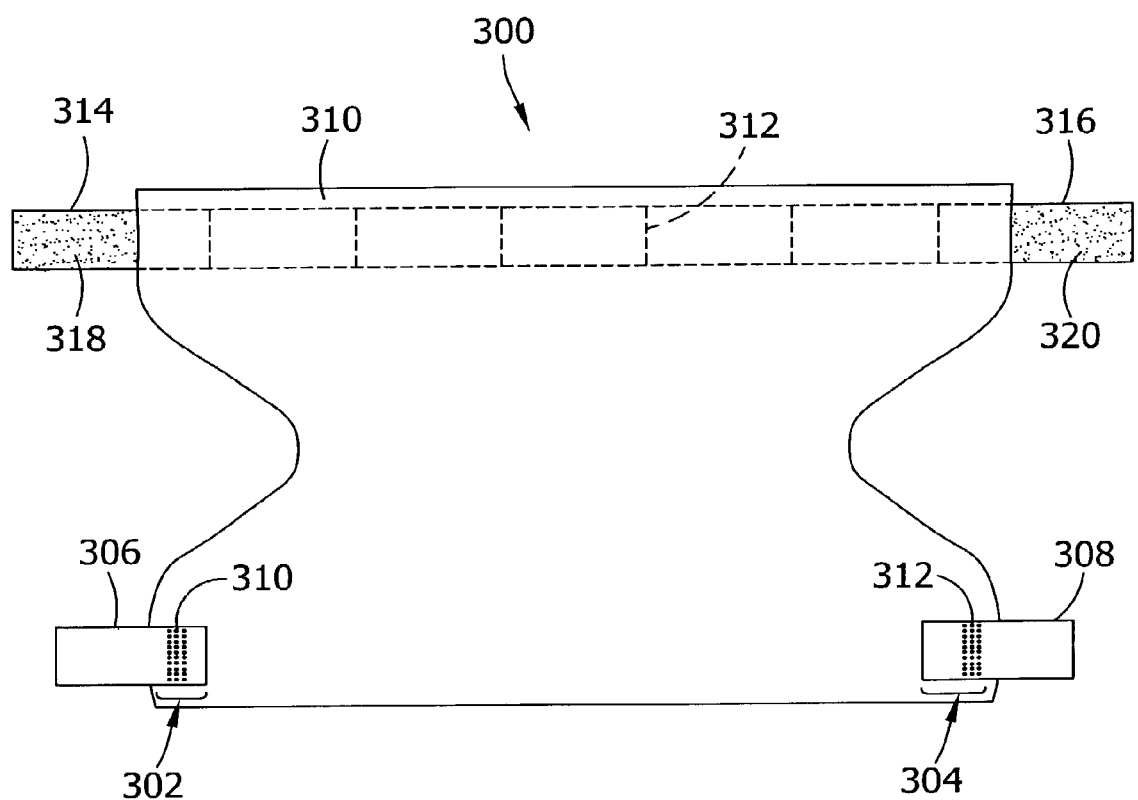
FIG. 11 is a top view of a diaper having ear attachment zones.

Referring now to FIG. 11, there is shown a diaper 300 having ear attachment zones 302 and 304. Ear attachment zones 302 and 304 are the areas of the diaper 300, typically on the outer cover, where the ears 306 and 308 may be attached and bonded to the diaper 300. Ear attachment zones 302 and 304 may be subjected to significant stress and shear forces during the ear attachment portion of the manufacturing process and/or during consumer use. The ears 306 and 308 may be ultrasonically bonded to the diaper 300 in ear attachment areas 302 and 304 with ultrasonic bonds 310 and 312. This ultrasonic bonding imparts stress and shear forces on the diaper material 300 and in some cases can result in tearing, shredding, or puncturing of the diaper material 300 in ear attachment zones 302 and 304 resulting in an unuseable diaper. This is particularly true when materials having a basis weight of about 0.3 osy or less are utilized in the construction of the diaper.

In accordance with one embodiment of the present invention, the material basis weight increasing agents as described herein may be introduced onto the diaper 300 in ear attachment zones 302 and 304 to increase the material basis weight, and hence the overall strength, of ear attachment zones 302 and 304 such that the ear attachment zones 302 and 304 of diaper 300 have increased strength and durability and are substantially more resistant to tearing and shredding during ultrasonic bonding in the manufacturing process and/or during use. This embodiment of the present invention allows a substantially stronger ear attachment zone to be created without the use of thicker, and hence more expensive, raw material components, such as a thicker outer cover. The thinner material may be selectively treated to increase the material basis weight, and hence the thickness, and strength only in specific areas where such an increase is desirable.

When the adhesive compositions of the present invention are utilized as material basis weight increasing agents, it is generally desirable to introduce a sufficient amount of the material basis weight increasing agent onto the desired area to increase the material basis weight of the treated area of the desired component by at least about 10%, more desirably at least about 25%, still more desirably by at least about 50%, and most desirably by at least about 100%. For example, if an outer cover component is formed from 0.3 osy spunbond polypropylene, it would be desirable to increase the material basis weight in the ear attachment zone utilizing the adhesive composition of the present invention by at least about 100% so the resulting ear attachment zone had a material basis weight of at least about 0.6 osy. Such increases in the material basis weight substantially improve the strength of the treated component and its resistance to shear forces which can result in tearing.

In a related embodiment, the adhesive compositions as described herein can be utilized as both an adhesive composition for bonding two components together and as a material basis weight increasing agent. For example, the adhesive compositions could be used to adhesively attach the ears 306 and 308 to the diaper 300 while at the same time increasing the material basis weight of the treated area to improve strength. A sufficient amount of adhesive composition/material basis weight increasing agent is introduced onto the material to increase the basis weight of the material to a desired level of, for example, about 0.8 osy while simultaneously being utilized as an adhesive to attach the ears to the diaper. Thus, the adhesive composition can serve the dual function of adhesive and material basis weight increasing agent.

As mentioned above, the material basis weight increasing agents as described herein can be utilized in any area of a laminated absorbent disposable product where an increase in material basis weight is desirable to increase the strength of a given area. Typically, an increase in material basis weight is desirable in areas where bonding or component attachment will take place or where the product is otherwise subjected to significant stress and/or shear forces during manufacture or use. Along with the ear attachment zones described above, other zones of a diaper where an increase in material basis weight and strength may be beneficial include, for example, the containment flap attachment zone, the leg elastic and waist band attachment zones, and the pub patch attachment zone. Because each of these areas are typically subjected to ultrasonic or another type of bonding during the manufacturing process, an increase in strength and durability is typically desirable. Additionally, based on the disclosure herein, one skilled in the art will recognize that one or more entire areas of a laminated disposable absorbent product could be reinforced with the adhesive compositions of the present invention to provide an increase in material strength.

In another embodiment of the present invention, the material basis weight increasing agents described herein can be introduced onto a component, or a portion of a component, of a disposable absorbent product to make the product more easily and efficiently manufactured; that is, the material basis weight increasing agent can be introduced onto the product to increase the material basis weight of the product in a specified area to make the manufacturing process more simple and run more efficiently, and decrease the number of unsuitable products produced. As mentioned above, it is typically desirable to utilize thinner components in the manufacturing of absorbent products to reduce costs and improve product performance. One problem that the use of such thinner components may impart on the manufacturing process, as compared to product performance, is that during manufacturing, where components and products may move along the manufacturing line at very high rates of speed, is that thinner components may shift or blow out of place or fold over onto themselves due to the high manufacturing speeds resulting in an undesirable position which can result in the production of an unsatisfactory product. By introducing the material basis weight increasing agents of the present invention onto a specific region of an absorbent product, the increased material basis weight of the specific component can result in a properly aligned product throughout the manufacturing process and an increase in efficiency. This is a desirable method of increasing efficiency as compared to utilizing heavier weight basis materials throughout the product to control component shifting during manufacturing.

Referring again to FIG. 11, there is shown a pub patch 310 (also commonly referred to as a landing zone area or landing zone patch which may be comprised of a PUB type or Guilford loop type material) attached to diaper 300 with adhesive 312, which may be the adhesive composition of the present invention, and pub patch 310 ends 314 and 316 which extend outside of diaper 300. After attachment to the diaper 300, pub patch 310 ends 314 and 316 may be subject to substantial movement and displacement during the diaper manufacturing process as the diaper moves quickly along the manufacturing line as they are typically constructed of thin basis weight material and extend past the outer edge of the diaper. Often, the pub patch 310 ends 314 and 316 can fold over onto themselves as they move along the manufacturing line. If pub patch 310 ends 314 and 316 move from the desired position, the diaper may become improperly manufactured and may have to be discarded as the pub patch 310 ends 314 and 316 may interfere with subsequent processing steps. In an alternative embodiment (not shown) the pub patch may also be configured to not extend beyond the outside of the diaper.

To address the problem of unwanted component movement along the manufacturing line, material basis weight increasing agent 318 and 320 may be introduced onto the pub patch 310 ends 314 and 316 to increase the material basis weight of the pub patch 310 ends 314 and 316 such that the material basis weight is sufficient for the pub patch 310 ends 314 and 316 to substantially resist movement and misplacement during the manufacturing process. Such reinforcement of areas of the diaper during manufacturing can substantially improve the efficiency of the manufacturing process by resulting in fewer wasted products, and can be more efficient as compared to the use of thicker materials throughout the laminated product.

When the material basis weight increasing agents of the present invention are utilized to make a product, or portion of a product, more easily manufactured, it is generally desirable to introduce sufficient material basis weight increasing agent onto the product to increase the material basis weight by at least about 10%, more suitably at least about 25%, still more suitably at least about 50%, and most suitably at least about 100%.

In another embodiment of the present invention, the material basis weight increasing agents described herein can be utilized in combination with a material to increase the material basis weight of a component, or portion thereof, of a laminated product to strengthen the component, or portion thereof, and/or increase the processability of the product. In this embodiment, a layer of material, such as a layer of spunbond polypropylene, is selectively attached to the material comprising the component of interest in a specific region for material basis weight increase utilizing the adhesive compositions of the present invention. Typically, the specified region will be a region where the product is subjected to stress or shear during manufacturing or wear and, without additional strength, may fail. For example, the specific region may be the ear attachment zone of a diaper where the ears are ultrasonically bonded to the outer cover of the diaper. Because the ultrasonic bonding can impart stress on the outer cover as discussed herein, reinforcement of this area can significantly improve the resulting product by decreasing the amount of material failures. In this embodiment, less adhesive composition is required to increase the material basis weight of the component as a second piece of material is bonded to the component utilizing the adhesive composition.

Figure 12:
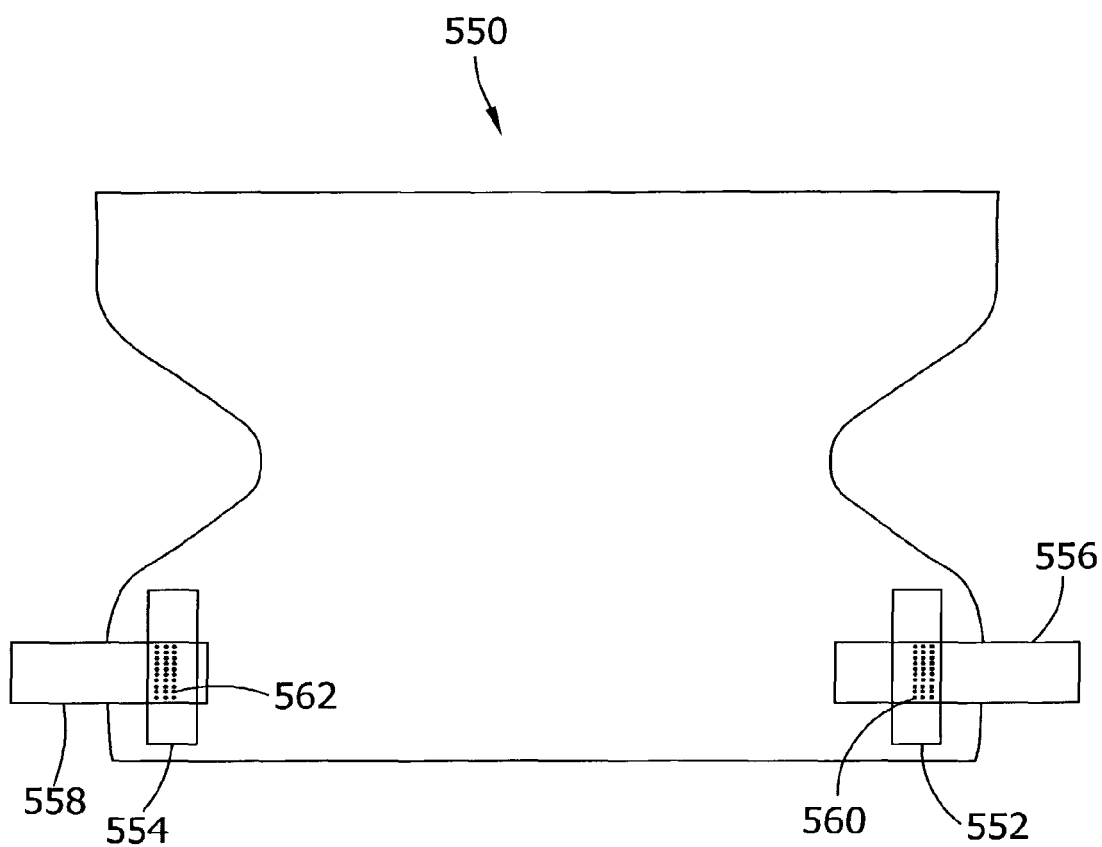
FIG. 12 is a top view of a diaper having reinforcement pieces and ears.

Referring now to FIG. 12, there is shown a diaper 550 comprising material reinforcement pieces 552 and 554 and ears 556 and 558. Material reinforcement pieces 552 and 554 are attached to the diaper 550 with an adhesive (not shown), which may be an adhesive of the present invention described herein, prior to the bonding of the ears 556 and 558 to the diaper 500. Material reinforcement pieces 552 and 554 increase the material basis weight of the ear attachment region and increase the strength of that region prior to the introduction of the ears. Ears 556 and 558 are attached to the reinforcement pieces 552 and 554 and diaper 500 with ultrasonic bonds 560 and 562. The reinforcement pieces 552 and 554 increase the material basis weight of the diaper in the ear attachment area such that the ultrasonic bonds which are used to attach the ears to the diaper are much less likely to tear material and result in a failed product. Such reinforcement pieces could be used in numerous areas of disposable absorbent products including, for example, containment flap attachment zones and elastic attachment zones.

The material basis weight increasing agents of the present invention as described herein can be applied to the desired component of the absorbent article in any manner suitable to increase the basis weight and the strength of the treated component. For example, the adhesive composition can be introduced onto the desired area of the absorbent product in a bead-type continuous pattern, a swirl pattern, a slot-coated pattern, or a melt-blown spray-type pattern. The pattern of introduction of the adhesive composition as described herein onto the component is typically not critical, and may vary upon manufacturing requirements.

In another embodiment of the present invention, the material basis weight increasing agents described herein may be introduced onto the desired component in a feathered or tapered pattern to improve product performance while utilizing a reduced amount of adhesive composition resulting in a cost savings. Feathering of the adhesive composition can provide maximum material basis weight increase and strength increase in specific areas while providing some material basis weight increase in other areas.

Figure 13:
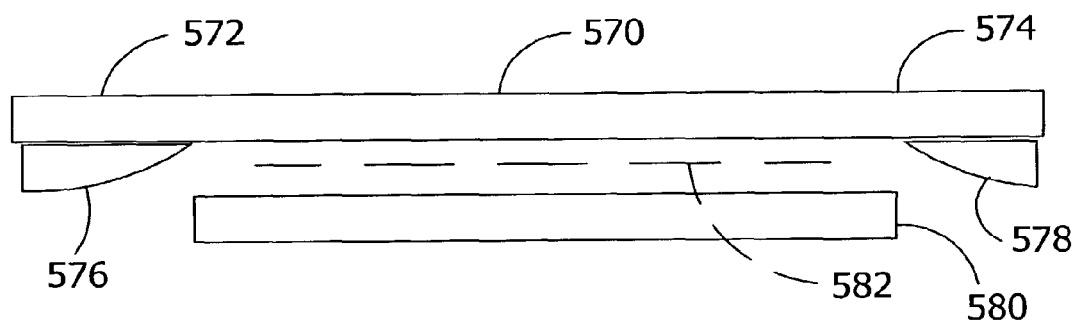
FIG. 13 is a cross-sectional view of a diaper having a pub patch bonded to the outer cover with an adhesive composition according to a first embodiment of the present disclosure.

In one embodiment, a feathering pattern could be utilized to provide the desired level of material basis weight increase on pub patch ends to reduce the likelihood that the pub patch ends will move substantially or fold over onto themselves during manufacturing. Referring now to FIG. 13, there is shown a pub patch 570 bonded to outer cover 580 with adhesive composition 582, which may be the adhesive composition of the present invention. Pub patch 570 has pub patch ends 572 and 574 which extend beyond outer cover 580. Pub patch 570 ends 572 and 574 may move or fold over onto themselves during manufacturing as described above and, as such, may need material basis weight increase to decrease this potential and increase efficiency in the manufacturing process.

Referring again to FIG. 13, pub patch 570 ends 572 and 574 have feathered adhesive composition 576 and 578 applied thereto to increase the material basis weight of pub patch 570 ends 572 and 574. The adhesive composition introduced onto the pub patch ends is thinner near the area where the pub patch is bonded to the outer cover, and becomes increasingly thicker as the distance away from the pub patch/outer cover bond increases and where the opportunity for movement during manufacturing is greatest. This feathered pattern provides for material basis weight increase while using less adhesive composition than if applied evenly across the pub patch ends.

Figure 14:
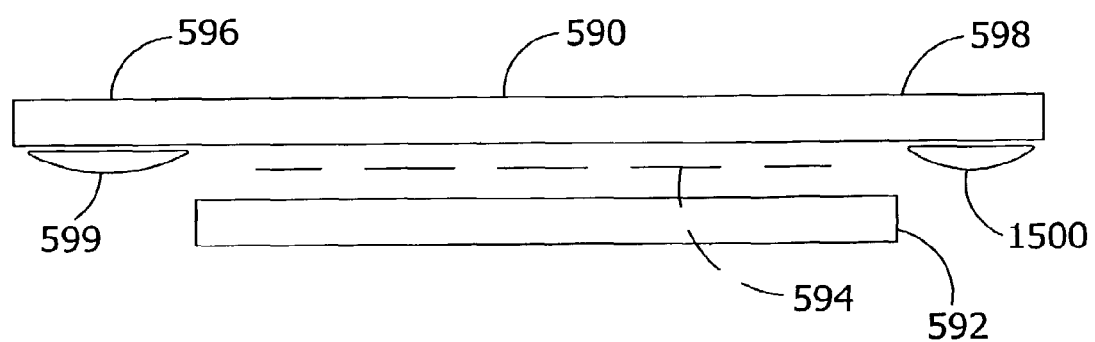
FIG. 14 is a cross-sectional view of a diaper having a pub patch bonded to the outer cover with an adhesive composition according to a second embodiment of the present disclosure.

In another embodiment, the feathered adhesive composition of the present invention may take the shape of a dome. Referring to FIG. 14, there is shown a pub patch 590 bonded to outer cover 592 with adhesive 594, which may be an adhesive composition of the present invention. Pub patch 590 has pub patch ends 596 and 598. Pub patch ends 596 and 598 have feathered adhesive compound 599 and 1500 applied thereto to increase the material basis weight of the pub patch ends 596 and 598. The domed shape of the feathering may be advantageous in some cases where as it may provide for more flexibility at the pub patch/outer cover joint, and may impart less stress on the beginning of the attachment zone.

Tests/Procedures
Laminate Production

Figure 6:
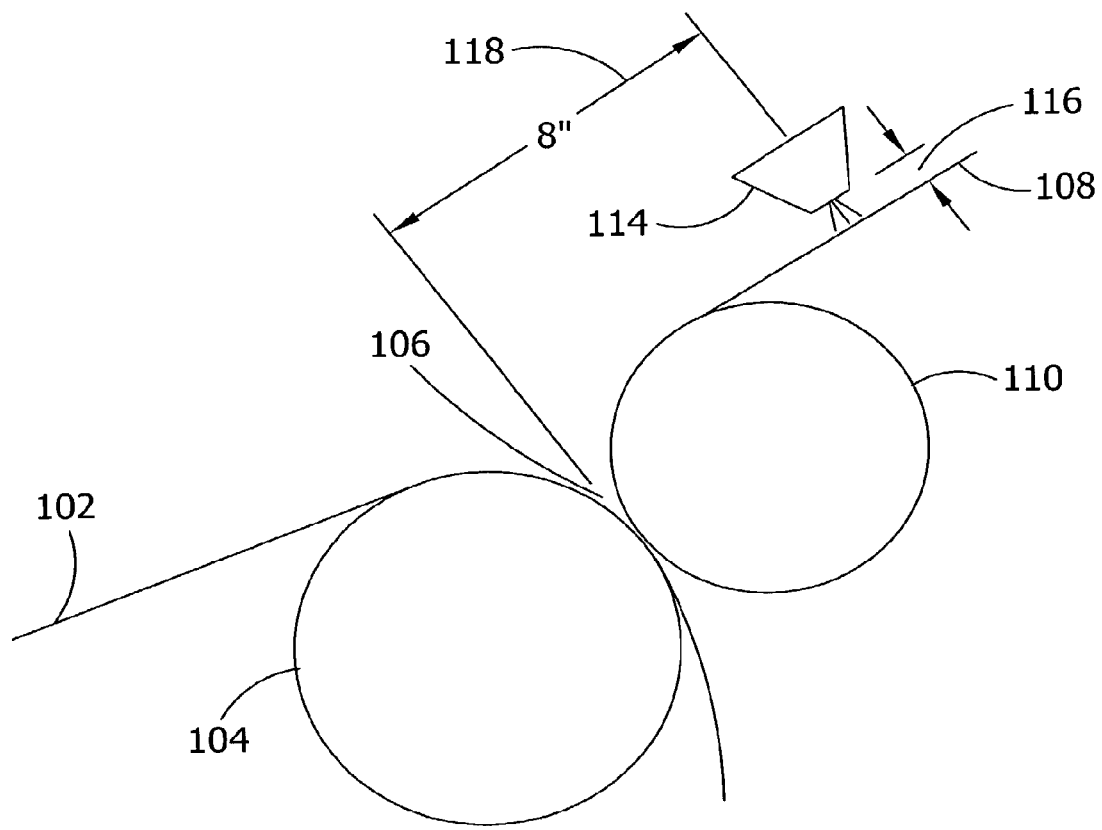
FIG. 6 shows one version of a process for making a laminate comprising an adhesive composition.

Laminates were made on equipment available from J & M Laboratories, a business having offices located in Dawsonville, Ga. As depicted in FIG. 6, a first substrate or first base material 102, such as a nonwoven web, was directed from its corresponding unwind stand (not shown) to the surface of a 6-inch-diameter steel roll 104 and through a nip 106 between the steel roll and a 4-inch-diameter rubber roll 110. A second substrate or second base material, such as a second nonwoven web 108, was directed from its unwind stand (not shown) to the surface of the rubber roll and through the nip. Typically, the equipment was operated at a speed of 300 feet per minute.

The applicator 114 used to deposit the adhesive was positioned so that the face of the depicted nozzle, which was roughly parallel to the surface of the web to which adhesive was first applied, was 1.5 inches 116 from the surface of the web. Furthermore, the central axis of the depicted nozzle, which is perpendicular to the web to which adhesive is first applied, was 8 inches 118 from a parallel axis that passes through the nip defined by the rubber and steel rolls.

Figure 7A:
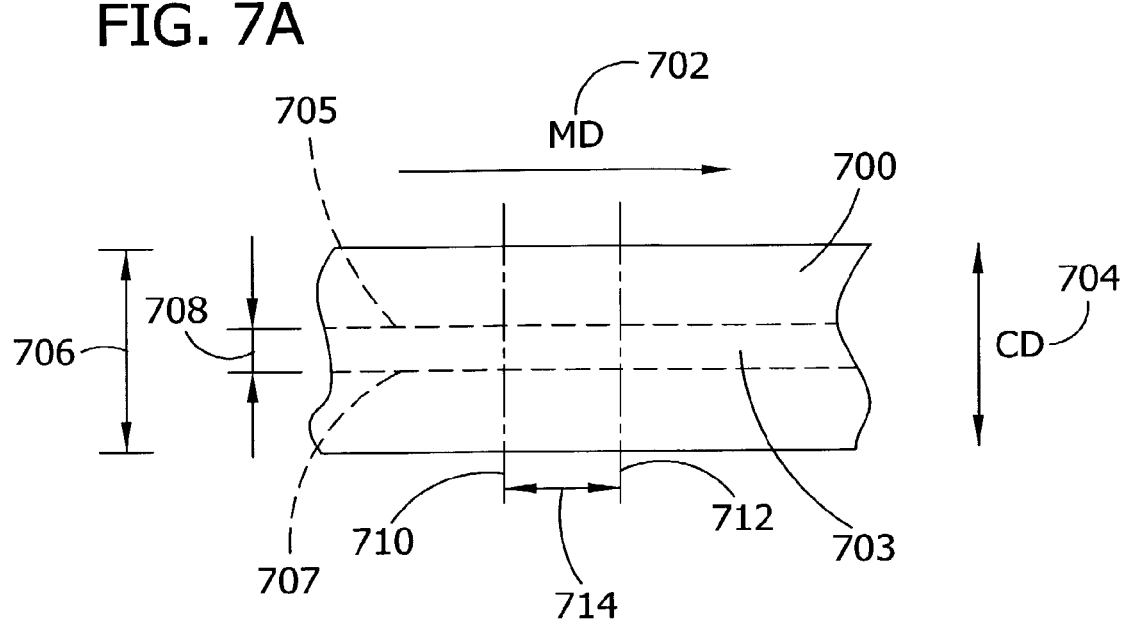
FIG. 7A shows a top view of a portion of one version of a laminate.

From the discussion above, it should be understood that the substrates and the resulting laminate 700 generally moved in a machine direction 702 (see FIG. 7A) during their preparation. FIG. 7A depicts a top view of a portion of a laminate after it has been formed. A continuous band of adhesive 703, whether it was applied using meltblowing, cycloidal, slot, or other application technique, is denoted by broken lines 705 and 707. The adhesive is under the upper substrate of the laminate depicted in the Figure. As the laminate is made in a continuous manner, it is wound up in the form of a roll. The direction that is perpendicular to the machine direction, but lying within the plane of the laminate, is denoted as the cross-machine direction 704. Typically the width of the formed laminate, width denoting the dimension parallel to the cross-machine direction, was about 1 to about 12 inches 706. The width of the applied adhesive, again width denoting a dimension parallel to the cross-machine direction, typically was from about 0.5 inch to about 10 inches 708. Also, the band of adhesive was generally applied such that it was substantially centered in the laminate (in the width dimension). Unless otherwise noted, the width of the applied adhesive was about 0.5 inch to about 2 inches. (Note: the lines 710 and 712 denote the manner in which a 2-inch 714 sample was cut for subsequent analysis; sample preparation and orientation is discussed in more detail below).

The selected adhesive was either an adhesive of the present invention (as noted in the Examples below), or a hot-melt adhesive (again as noted in the Examples below). The adhesive was added using a variety of patterns, including a meltblown pattern, a swirl or cycloidal pattern, or a pattern resulting from slot coating. Typically the adhesives were heated to temperatures ranging from about 350 degrees Fahrenheit to about 380 degrees Fahrenheit prior to application to one of the substrates. Unless otherwise noted, the selected adhesive was added using a meltblown pattern. As stated above, unless otherwise noted the width of the added adhesive was about 0.5 inch to about 2 inches. The selected adhesive was added in amounts varying from about 1 gram per square meter to about 50 grams per square meter, with specific application levels or add-on levels noted in the examples.

A number of different substrates were used to prepare the laminates, as noted in the Examples below. The substrates that were used included: a necked-bonded laminate ("NBL"), which generally comprised a polyethylene layer sandwiched between two polypropylene, spunbonded layers; a polypropylene, spunbonded layer ("SB"); and an outercover comprising a polyethylene layer and a polypropylene, spunbonded layer. For tests where the performance of a laminate of the present invention was compared to the performance of a laminate prepared using a conventional hot-melt adhesive, the same substrates were used to prepare both the laminate of the present invention and the conventional laminate.

180 Static Peel Test

Figure 7B:
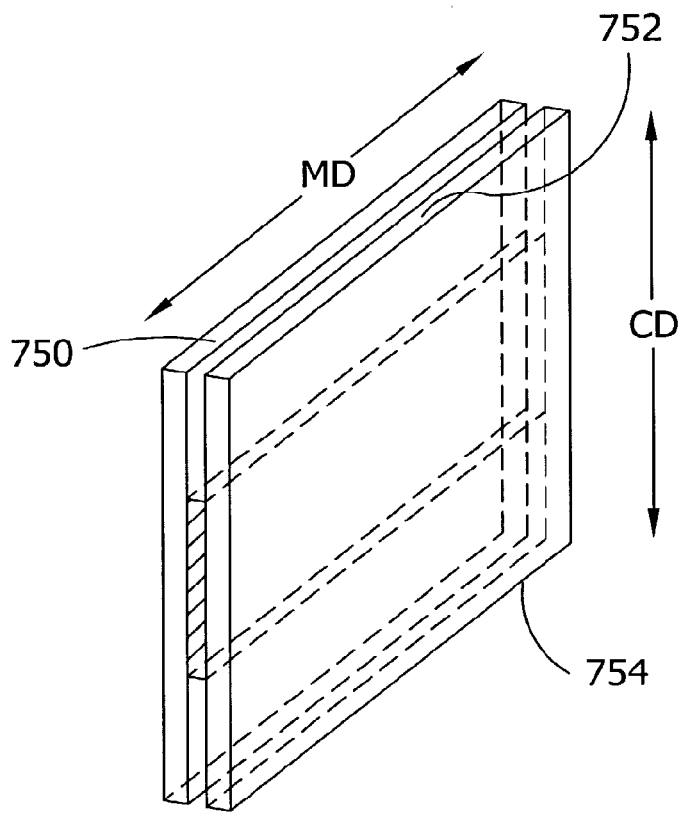
FIG. 7B shows a sectional, perspective view of a test panel cut from one version of a laminate.

The static peel test was used to determine the approximate time to failure of a laminate in which one substrate was adhesively bonded to another substrate. All laminates were made as described above on a J & M machine. Samples were cut from the prepared laminate which was in the form of a continuous web prepared on a J & M machine, as shown in FIG. 7A. FIG. 7B depicts a sectional view of a sample that has been removed from the laminate depicted in FIG. 7A. The test procedure was conducted as follows: 1. A 2-inch test panel was cut from the laminate, as shown in FIGS. 7A and 7B. 2. The test laminate was then suspended vertically in a forced-air oven, model number OV-490A-2 manufactured by Blue M Co., a business having offices in Blue Island, Ill., that had been pre-heated to a temperature of 100 degrees Fahrenheit, with the top of one substrate layer 750 secured by a clamp or other mechanical securing element, the clamp or securing element having a width of about 2 inches. 3. A 500-gram weight was then affixed to the top edge 752 of the other substrate using a clamp or other mechanical securing element. Again, the clamp or securing element used to attach the 500-gram weight was about 2 inches. 4. Approximately every ½ hour, the test laminate was visually examined by quickly opening the oven door. The time at which one substrate or layer had detached from the other substrate or layer was recorded. The recorded time corresponded to the approximate time of failure of the laminate. The two, now separate, substrates were then examined to determine the nature of the failure. If the substrates separated such that most of the adhesive remained on one of the substrates, then failure was deemed to be an adhesion failure (i.e., failure likely occurred at the interface between one of the substrates and the adhesive composition). If the substrates separated such that adhesive remained on both substrates, the failure was deemed to be a cohesion failure (i.e., separation likely occurred within the adhesive composition itself). If neither of these conditions arose, but instead one or both of the substrates failed (i.e., that portion of the laminate bonded by the adhesive, usually a 1 inch by 2 inch area of the test panel), then the failure was deemed a material failure of one or both substrates.

Static Shear Test

The static shear test was used to determine the approximate time to failure of a laminate in which one substrate was adhesively bonded to another substrate. All laminates were made as described above on a J & M machine. Samples were cut from the prepared laminate, which was in the form of a continuous web prepared on a J & M machine, as shown in FIG. 7A. FIG. 7B depicts a sectional view of a sample that has been removed from the laminate depicted in FIG. 7A. The test procedure was conducted as follows: 1. A 2-inch test panel was cut from the laminate, as shown in FIGS. 7A and 7B. 2. The test laminate was then suspended vertically in a forced-air oven, model number OV-490A-2 manufactured by Blue M Co., a business having offices in Blue Island, Ill., that had been pre-heated to a temperature of 100 degrees Fahrenheit, with the top of one substrate layer 750 secured by a clamp or other mechanical securing element, the clamp or securing element having a width greater than 2 inches. 3. A 500-gram weight was then affixed to the bottom edge 754 of the other substrate using a clamp or other mechanical securing element. Again, the clamp or securing element used to attach the 500-gram weight was about 2 inches. 4. Approximately every ½ hour, the test laminate was visually examined by quickly opening the oven door. The time at which one substrate or layer had detached from the other substrate or layer was recorded. The recorded time corresponded to the approximate time of failure of the laminate. The two, now separate, substrates were then examined to determine the nature of the failure. If the substrates separated such that most of the adhesive remained on one of the substrates, then failure was deemed to be an adhesion failure (i.e., failure likely occurred at the interface between one of the substrates and the adhesive composition). If the substrates separated such that adhesive remained on both substrates, the failure was deemed to be a cohesion failure (i.e., separation likely occurred within the adhesive composition itself). If neither of these conditions arose, but instead one or both of the substrates failed (i.e., that portion of the laminate bonded by the adhesive, usually a 1 inch by 2 inch area of the test sample), then the failure was deemed a material failure of one or both substrates.

Dynamic Peel and Shear Testing

To determine dynamic peel strength, a laminate was tested for the maximum amount of tensile force that was needed to pull apart the layers of the laminate. Values for peel strength were obtained using a specified width of laminate (for the present application, 2 inches); clamp jaw width (for the present application, a width greater than 2 inches); and a constant rate of extension (for the present application, a rate of extension of 300 millimeters per minute). For samples having a film side, the film side of the specimen is covered with masking tape, or some other suitable material, in order to prevent the film from ripping apart during the test. The masking tape is on only one side of the laminate and so does not contribute to the peel strength of the sample. This test uses two clamps, each clamp having two jaws with each jaw having a facing in contact with the sample, to hold the material in the same plane, usually vertically. The sample size is 2 inches (10.2 cm) wide by 4 inches (20.4 cm). The jaw facing size is 0.5 inch (1.25 cm) high by at least 2 inches (10.2 cm) wide, and the constant rate of extension is 300 mm/min. For a dynamic peel test, one clamp is attached to the top 750 of one substrate of a test panel (see FIG. 7B). The other clamp is attached to the top 752 of the other substrate of a test panel. During testing, the clamps move apart at the specified rate of extension to pull apart the laminate. The sample specimen is pulled apart at 180 degrees angle of separation between the two layers, and the peel strength reported is the maximum tensile strength, in grams, recorded during the test. Each of the peel strengths reported below is an average of five to nine tests. A suitable device for determining the peel strength testing is a SINTECH 2 tester, available from the Sintech Corporation, a business having offices at 1001 Sheldon Dr., Cary, N.C. 27513; or an INSTRON Model™, available from the Instron Corporation, a business having offices at 2500 Washington St., Canton, Mass. 02021; or the Thwing-Albert Model INTELLECTII available from the Thwing-Albert Instrument Co., a business having offices at 10960 Dutton Rd., Philadelphia, Pa. 19154.

For a dynamic shear test, the procedure is as described above except that one clamp is attached to the top 750 of one substrate of the laminate, and the other clamp is attached to the bottom 754 of the other substrate of the laminate. The shear strength reported is the maximum tensile strength, in grams, recorded during the test. Each of the shear strengths reported is an average of five to nine tests.

Accretion Value or Relative Accretion Value

The relative accretion or build-up of an adhesive, alone or in combination with other materials, e.g., fibers, was measured by running a laminate comprising adhesive through a rotary ultrasonic bonder at 300 feet per minute for ten minutes (or other specified time). The rotary bonder included a horn and a dot-pattern anvil design. The ultrasonic generator was a 3005 Autotrac, 20 KHz, 3000 watt generator from Dukane Corporation, a business having offices in Saint Charles, Ill. A variable-power supply was used to vary power available to the generator. The power level used was 100%, which corresponded to an ultrasonic wave amplitude of 2.8 to 3.5 mil (1 mil is equivalent to $\frac{1}{1000}$ inch). The horn diameter was approximately 6.75 inches, with the pressure exerted by the horn on the anvil typically about 40 pounds per square inch or more to ensure good contact between the substrate, web, or laminate being processed; the horn; and the anvil.

The anvil had a dot pattern, with each pin having a 45 mil diameter and a height of 31 mil. The spacing between each pin was about 79 mil. The anvil pins were made from D2 tool steel, which was heat treated and through hardened to Rockell C 60-63. The width of the pattern was 300 mil. The diameter of the anvil was about 5.7 inches.

Additional detail on related designs and specifications pertaining to ultrasonic equipment is found in U.S. Pat. Nos. 5,110,403 and 5,096,532, both of which are incorporated by reference in a manner consistent with the present document.

The build-up, which consisted of adhesive and other material, e.g., nonwoven fibers, was scraped from the horn and the anvil and weighed, giving the accretion value for the evaluated adhesive.

Laminates for this evaluation were prepared by meltblowing adhesive to get a 10 gram per square meter coverage on an approximately 0.4-ounce-per-square-yard polypropylene spunbond nonwoven facing. As shown above, adhesive was applied to one facing. This facing with the applied adhesive was then nipped together with the other facing (or substrate, in this case another 0.4 osy polypropylene spunbond substrate) to form a laminate. Typical lamination speeds were 300 feet per minute.

Conventional hot-melt adhesives that were used to prepare laminates prior to accretion-value tests included: an adhesive available under the designator H2800 from Bostik-Findley, a business having offices in Milwaukee, Wis.; an adhesive available under the designator H2525A from Bostik-Findley; and an adhesive available under the designator N.S.10242-94A from National Starch Co., a business having offices in Bridgewater, N.J.

A laminate made using a conventional hot-melt adhesive, or an adhesive of the present invention, was run through ultrasonic-bonding equipment under the conditions described above. The accretion or buildup was scraped off the various ultrasonic-bonding surfaces after a selected time and weighed. Relative-accretion values may be calculated by dividing the accretion value of the laminate comprising an adhesive of the present invention by the accretion value of a selected conventional hot-melt adhesive (e.g., a conventional hot-melt adhesive for which an adhesive of the present invention is to be substituted).

Thermal Stability: Thermogravimetric Analysis and Differential Scanning Calorimetry The thermal stability of versions of adhesive compositions of the present invention was determined using thermogravimetric analysis and differential scanning calorimetry. For the thermogravimetric analysis, a sample of adhesive was placed in a sample holder in the heating element of a Model 951 Thermogravimetric Analyzer made by TA Instruments, a business having offices in New Castle, Del. The sample was heated from room temperature, which was approximately 21 C, to a temperature of 450 C at a heating rate of 10 C per minute. The sample was heated under a dynamic atmosphere of air with a flow of approximately 80 milliliters per minute. The crucible was continuously weighed during heating so that any decrease in weight could be detected. The resulting weight-change curves for the tested adhesives, i.e. plots of sample weight versus temperature, showed that isotactic polypropylene, atactic polypropylene, and blends of atactic and isotactic polypropylene (with the blends typically ranging from about 10 weight percent to about 30 weight percent isotactic polypropylene) generally had a decomposition temperature of about 235 C in air.

For the analysis using differential-scanning calorimetry, a 10 milligram sample of isotactic polypropylene (see Example 1 below) was placed in the sample chamber of the heating/cooling block of a Model 2920 differential scanning calorimetry analyzer made by TA Instruments. The sample was heated from −100 C to 250 C, then cooled to −100 C, then reheated again to 250 C, at a heating and cooling rate of 10 C per minute. A Liquid Nitrogen Cooling Accessory, also made by TA Instruments, was attached to the Model 2920 differential scanning calorimeter. The results indicated that there was a significant peak showing energy absorption over the temperature range from about 150 C to about 170 C, with a peak at about 161 C (i.e., indicative of melting).

A 10-milligram sample of amorphous polypropylene (see Example 1 below) was evaluated using the same differential-scanning calorimetry procedure. The analysis indicated that the amorphous polypropylene had a glass-transition temperature of about −10 degrees Celsius.

Viscosity

Atactic and isotactic polypropylene blends of varying compositions were formulated into 10.0 g samples. These samples were heated to or above 400 F in a Brookfield Digital Rheometer Model DV-Ill using a Brookfield Temperature Controller (available form Brookfield Engineering Laboratories, a business having offices in Stoughton, Mass.). Spindle #27 was used for all trials and the instrument was appropriately zeroed and calibrated before each test. After the sample had been stabilized and sufficiently mixed at 400 degrees Fahrenheit (or above), readings of the spindle rpm, torque, and viscosity were recorded. The temperature was then lowered, typically in 10 F increments, and the sample allowed to stabilize for 10-15 minutes before subsequent readings of spindle rpm, torque, and viscosity were taken. For various blends of isotactic polypropylene and atactic polypropylene (see Example 1 below for characteristics), Brookfield viscosities at 360 degrees Fahrenheit were: for 10 weight percent isotactic polypropylene/90 weight percent atactic polypropylene, the viscosity was 3200 centipoise; for 20 weight percent isotactic polypropylene/80 weight percent atactic polypropylene, the viscosity was 4700 centipoise; for 30 weight percent isotactic polypropylene/70 weight percent atactic polypropylene, the viscosity was 6300 centipoise; and for 40 weight percent isotactic polypropylene/60 weight percent atactic polypropylene, the viscosity was 7000 centipoise.

For various blends of isotactic polypropylene and atactic polypropylene (see Example 1 below for characteristics), Brookfield viscosities at 380 degrees Fahrenheit were: for 10 weight percent isotactic polypropylene/90 weight percent atactic polypropylene, the viscosity was 2500 centipoise; for 20 weight percent isotactic polypropylene/80 weight percent atactic polypropylene, the viscosity was 3600 centipoise; for 30 weight percent isotactic polypropylene/70 weight percent atactic polypropylene, the viscosity was 4900 centipoise; and for 40 weight percent isotactic polypropylene/60 weight percent atactic polypropylene, the viscosity was 5300 centipoise.

Molecular Weight (Number Average and Weight Average)

Atactic polypropylene, isotactic polypropylene, and blends of atactic and isotactic polypropylene were sent to American Polymer Standard Corp., a business having offices in Philadelphia, Pa., for molecular-weight determinations. The number-average and/or weight-average molecular weights were determined by American Polymer using gel-permeation chromatography on a Waters Model No. 150 gel-permeation chromatograph. The determinations were made using: four, linear, Shodex GPC gel columns; poly(styrene-divinyl benzene) copolymers as standards; trichlorobenzene as the solvent, introduced to the chromatograph at a volumetric flow rate of 1.0 milliliter per minute; an operating temperature of 135 degrees Celsius; a sample-injection volume of 100 microliters; an M-150C-(64/25) detector; and a GPC PRO 3.13 IBM AT data module.

EXAMPLE 1

Amorphous (i.e., atactic) polypropylene (received as slightly yellowish, transparent, elastomeric, small blocks) was obtained from Sigma-Aldrich, a business having offices in Milwaukee, Wis. The amorphous polypropylene had a weight-average molecular weight of about 28,000 and a number-average molecular weight of 8400 (determined by American Polymer as discussed above). Furthermore, the procured amorphous polypropylene was determined to have a Brookfield viscosity of 23 poise at a temperature of 190 degrees Celsius (determine as described in the Tests/Procedures section above); and a glass-transition temperature of −10 degrees Celsius (determined, as described above, using differential-scanning calorimetry at a heating rate of 10 degrees Celsius per minute).

Isotactic polypropylene was obtained from Sigma-Aldrich in the form of white, spherical particles. The isotactic polypropylene was determined to have a number-average molecular weight of about 20,000 and a weight-average molecular weight of about 110,000. The procured isotactic polypropylene had a melting index of 1000 grams per ten minutes (at a temperature of 230 degrees Celsius and when subjected to a force of 2.16 kg; see ASTM D 1238, which was used for this determination, for additional detail on measuring the melting index).

Four and ½ kilograms of amorphous polypropylene were added to an adhesive-supply unit; i.e., a hot-melt processing system comprising a hot-melt tank. The adhesive-supply unit was a Dynamelt S Series Model Number DM310, available from ITW Dynatec, a business having offices in Hendersonville, Tenn. The adhesive-supply unit was set at a temperature of about 370 degrees Fahrenheit. After about one hour the amorphous polypropylene was in substantially liquid form. One-half kilogram of isotactic polypropylene was then added to the already-liquefied amorphous polypropylene. To ensure adequate mixing and uniformity of the resulting blend, a circulatory pump associated with the adhesive-supply unit was activated. The circulatory pump, a gear pump, was operated so that approximately 0.5 to 0.8 pounds per minute of the precursor materials to the uniform blend were circulated. The pump was run for about 1 hour, the time at which the isotactic polypropylene solids were observed to have melted and become uniformly blended with the liquefied amorphous polypropylene.

The Brookfield viscosity of the blend was determined to be about 3000 centipoise at a temperature of 370 degrees Celsius.

EXAMPLE 2

A number of adhesives were used to bond two substrates together to make laminated structures using the procedures described above. The integrity of the bond between the two substrates was then tested using the static-peel test described above. In one evaluation, two necked-bonded laminate (NBL) substrates were bonded together. For additional detail on how NBLs and other neck-bonded materials are formed, see U.S. Pat. No. 5,336,545 to Morman, entitled "Composite Elastic Necked-Bonded Material," which is hereby incorporated by reference in its entirety in a manner consistent with the present document.

Laminates comprising two adhesively-bonded NBL substrates were made and tested as described above. Each laminate comprised a first NBL substrate, as described above, which was adhesively bonded to a second NBL substrate. For this particular example, each of the adhesives was slot-coated on to one of the substrate layers when making the laminate. Each adhesive was applied at an add-on level of about 20 grams per square meter. The same NBL substrate was used to make all laminates in this Example. The following comparative adhesive compositions were tested: (1) three hot-melt adhesive compositions identified by the alpha-numeric designators N.S. 8819-6C, N.S. 11414-19A, and N.S. 11414-19D, which are available from National Starch, a business having offices in Bridgewater, N.J.; (2) three hot-melt adhesive compositions identified by the alpha-numeric designators H8163, H2800, and H2727, which are all available from Bostik-Findley, a business having offices in Milwaukee, Wis.; and (3) an amorphous poly-alpha-olefin hot-melt adhesive, comprising a poly(ethylene-co-propylene) copolymer, which is available under the designator RT2730 from Huntsman Polymer Corp., Houston, Tex.

For this example, we made an embodiment of our invention by blending amorphous (i.e., atactic) polypropylene and isotactic polypropylene as described in Example 1 above. The static peel strength was determined as described above (i.e., a 500 gram mass was attached to the upper edge of one of the substrates of a test panel, with the test laminate suspended in an oven at a temperature of 100 degrees Fahrenheit). Results of this comparison are provided in Table 1 below:

TABLE 1

Comparison of Adhesive Performance

| Adhesive Type | Time of Detachment Between Two Substrates (i.e., Failure) | Nature of Failure |
| --- | --- | --- |
| N.S. 8819-6C | 2 hours or less | Cohesion |
| N.S. 11414-19A | 1 hour or less | Cohesion |
| N.S. 11414-19D | 1 hour or less | Cohesion |
| H8163 | 4 hours or less | Cohesion |
| H2800 | 4 hours or less | Cohesion |
| H2727 | 4 hours or less | Cohesion |
| RT2730 | 1 hour or less | Cohesion |
| Atactic/isotactic Polypropylene Blend (10% by weight isotactic polypropylene) | No bond failure after 30 hours | Necked-bonded laminate failed (i.e., the NBL substrate itself delaminated) |

EXAMPLE 3

Laminates were made with approximately 0.4 osy polypropylene, spunbonded substrates and adhesive applied in a meltblown pattern at an application level of about 10 grams per square meter. The laminate was then run through ultrasonic-bonding equipment using the procedures described above to determine the accretion value for each of the tested adhesives.

For a laminate made using the blend of atactic polypropylene and isotactic polypropylene described in Example 1, no buildup or residue was observed on the surfaces of the anvil and horn after the ultrasonic-bonding equipment had been run for approximately 8 and ½ minutes.

For a laminate made using the H2800 hot-melt adhesive, about 0.4 to about 0.5 grams of buildup or residue was collected from the surfaces of the anvil and horn after the ultrasonic-bonding equipment had been run for approximately 8 and ½ minutes.

For a laminate made using the H2525A hot-melt adhesive, about 1.8 grams of buildup or residue was collected from the surfaces of the anvil and horn after the ultrasonic-bonding equipment had been run for approximately 5 minutes.

For a laminate made using the N.S.10242-94A hot-melt adhesive, about 1.2 grams of buildup or residue were collected from the surfaces of the anvil and horn after the ultrasonic-bonding equipment had been run for approximately 5 minutes.

EXAMPLE 4

An embodiment of an adhesive composition of the present invention was used to bond two substrates together. For this Example, one of the substrates was a necked-bonded laminate substrate as discussed above. The second substrate was an outer cover as described above.

A laminate was made by adhesively bonding the NBL substrate to the outer cover material as described above. The adhesive was applied, and the NBL substrate and outer cover were nipped together in a way such that the polypropylene, spunbonded layer of the outer cover contacted the adhesive. A version of an adhesive composition of the present invention was made as discussed in Example 1 above. Specifically a blend of atactic and isotactic polypropylene was prepared and used in making the laminate described in this Example (with the isotactic polypropylene present as 10% by weight of the total weight of the blend). The adhesive was slot coated onto one of the substrates at 20 grams per square meter before the NBL substrate and outer cover were nipped together with the adhesive located between the two substrates. The static peel strength was determined as described above (i.e., a 500 gram mass was attached to the upper edge of one of the substrates, with the test panel suspended in an oven at a temperature of 100 degrees Fahrenheit). For a laminate comprising an adhesive of the present invention, the time at which one substrate detached from the other exceeded 24 hours. Again, there was a material failure, the NBL substrate itself delaminated, not a bond failure.

A second comparative laminate was made as described above (i.e. an NBL substrate was adhesively bonded to an outer-cover substrate, with each of the substrates being the same as those used to prepare a laminate comprising an adhesive of the present invention as described in the preceding paragraph) except an embodiment of an adhesive composition of the present invention was replaced with RT2730 available from Huntsman Polymer Corp., as described above. The adhesive was slot coated onto one of the substrates at 20 grams per square meter before the NBL substrate and outer cover were nipped together with the adhesive located between the two substrates. The static peel strength was determined as described above (i.e., a 500 gram mass was attached to the upper edge of one of the substrates, with the test panel suspended in an oven at a temperature of 100 degrees Fahrenheit). The time at which the substrates detached from one another was less than 1 hour. The nature of the detachment was a cohesive failure of the adhesive bond.

EXAMPLE 5

A laminate was made using a necked-bonded-laminate substrate (i.e., an NBL substrate) and an outercover material (as described above). The adhesive was applied, and the NBL substrate and outer cover were nipped together in a way such that the polypropylene, spunbonded layer of the outer cover contacted the adhesive. A version of an adhesive composition of the present invention was made as discussed in Example 1 above. Specifically a blend of atactic and isotactic polypropylene was prepared and used in making the laminate described in this Example (with the isotactic polypropylene present as 15% by weight of the total weight of the blend). The adhesive was meltblown onto one of the substrates at either 10 grams per square meter or 20 grams per square meter, as described below, before the NBL substrate and outer cover were nipped together with the adhesive located between the two substrates. The static peel strength was determined as described above (i.e., a 500 gram mass was attached to the upper edge of one of the substrates, with the test panel suspended in an oven at a temperature of 100 degrees Fahrenheit). For a laminate comprising an adhesive of the present invention, the time at which one substrate detached from the other exceeded 24 hours. Again, there was a material failure, the NBL substrate itself delaminated, not a bond failure. The dynamic-peel-test value for this same laminate, determined using the procedures discussed above, was about 870 grams per inch. The mode of failure for this dynamic test was a material failure (i.e., delamination of the NBL substrate).

A second laminate was made in the same way except that the adhesive of the present invention was applied at an add-on level of about 20 grams per square meter. The dynamic-peel-test value for this second laminate, prepared at a higher add-on level, was determined to be about 1160 grams per inch. The mode of failure for this dynamic test was a material failure (i.e., delamination of the NBL substrate).

The dynamic-shear-test value was also determined for each laminate. At an add-on level of 10 grams per square meter, the dynamic-shear-test value was about 2170 grams per square inch. At an add-on level of 20 grams per square meter, the dynamic-shear-test value was about 2190 grams per square inch. The mode of failure for both of these dynamic shear tests was a material failure (i.e., delamination of the NBL substrate).

EXAMPLE 6

A laminate was made using a necked-bonded-laminate substrate (i.e., an NBL substrate) and a stretch-bonded laminate ("SBL") as a substrate. An SBL is generally a laminate made up of an elongated elastic web or elongated elastomeric strands bonded between two spunbond layers, for example. For additional detail on how SBLs are formed, see European Patent Application No. EP 0 217 032 published on Apr. 8, 1987 in the names of Taylor et al., which is hereby incorporated by reference in its entirety in a manner consistent with the present document.

The adhesive was applied, and the NBL substrate and SBL substrate were nipped together with the adhesive now located between the substrates. A version of an adhesive composition of the present invention was made as discussed in Example 1 above, except that the composition was made so that isotactic polypropylene was present as 15% by weight of the total weight, i.e., the adhesive composition comprised 15 weight percent isotactic polypropylene. The adhesive was meltblown onto one of the substrates at either 20 grams per square meter or 40 grams per square meter, as described below, before the NBL substrate and SBL substrate were nipped together with the adhesive located between the two substrates. The dynamic-peel-test value for this NBL/SBL laminate comprising a 15-weight-percent isotactic polypropylene/85-weight-percent atactic polypropylene blend applied at 20 grams per square meter was determined to be 1220 grams per inch. The mode of failure for this dynamic test was a material failure (i.e., delamination of the NBL substrate and SBL substrate). The dynamic-shear-test value for this NBL/SBL laminate comprising a 15-weight-percent isotactic polypropylene/85-weight-percent atactic polypropylene blend applied at 20 grams per square meter was determined to be 2540 grams per square inch. The mode of failure for this dynamic shear test was a material failure (i.e., delamination of the NBL substrate).

The dynamic-peel-test value for this NBL/SBL laminate comprising a 15-weight-percent isotactic polypropylene/85-weight-percent atactic polypropylene blend applied at 40 grams per square meter was determined to be 1580 grams per inch. The mode of failure for this dynamic test was a material failure (i.e., delamination of the NBL substrate and SBL substrate). The dynamic-shear-test value for this NBL/SBL laminate comprising a 15-weight-percent isotactic polypropylene/85-weight-percent atactic polypropylene blend applied at 40 grams per square meter was determined to be 2280 grams per square inch. The mode of failure for this dynamic shear test was a material failure (i.e., delamination of the NBL substrate).

Another laminate was made in the same way except that the adhesive of the present invention was replaced with a conventional hot-melt adhesive available under the designator H2800 from Bostik-Findley. This adhesive was meltblown at an add-on level of 40 grams per square meter. The dynamic-peel-test value for this NBL/SBL laminate comprising the H2800 adhesive, applied at 40 grams per square meter, was determined to be 1470 grams per inch. The mode of failure for this dynamic test was a material failure (i.e., delamination of the NBL substrate and SBL substrate). The dynamic-shear-test value for this NBL/SBL laminate comprising the H2800 adhesive, applied at 40 grams per square meter, was determined to be 2800 grams per square inch. The mode of failure for this dynamic shear test was a material failure (i.e., delamination of the NBL substrate).

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A process for increasing the strength of a component of a laminated absorbent article, the process comprising increasing the material basis weight of the component by introducing a material basis weight increasing agent onto at least a portion of the component to increase the material basis weight of the treated portion of the component by at least about 10%, the material basis weight increasing agent comprising an atactic polymer and an isotactic polymer, the atactic polymer having a degree of crystallinity of less than about 20% and a number-average molecular weight of from about 1,000 to about 300,000, the atactic polymer being selected from the group consisting of atactic polystyrene, atactic polybutene, and combinations thereof, and the isotactic polymer having a degree of crystallinity of at least about 40% and a number-average molecular weight of from about 3,000 to about 200,000.

2. The process as set forth in claim 1 wherein the material basis weight increasing agent is hot-melt processable at less than about 450 degrees Fahrenheit.

3. The process as set forth in claim 1 wherein the material basis weight increasing agent comprises from about 50 to about 90 weight percent of the atactic polymer and from about 5 to about 50 weight percent of the isotactic polymer.

4. The process as set forth in claim 1 wherein the isotactic polymer comprises isotactic polypropylene.

5. The process as set forth in claim 1 wherein the isotactic polymer is selected from the group consisting of high density poylethylene, isotactic polystyrene, isotactic polybutene, and combinations thereof.

6. The process as set forth in claim 1 wherein the component has a material basis weight of from about 0.2 to about 0.6 osy before the introduction of the material basis weight increasing agent.

7. A process for increasing the strength of a component of a laminated absorbent article, the process comprising increasing the material basis weight of the component by bonding a layer of material onto at least a portion of the component to increase the material basis weight of the treated portion of the component by at least about 10%, the layer of material being bonded to the component with an adhesive composition, the adhesive composition comprising an atactic polymer and an isotactic polymer, the atactic polymer having a degree of crystallinity of less than about 20% and a number-average molecular weight of from about 1,000 to about 300,000, the atactic polymer being selected from the group consisting of atactic polystyrene, atactic polybutene, amorphous polyolefin copolymer and combinations thereof, and the isotactic polymer having a degree of crystallinity of at least about 40% and a number-average molecular weight of from about 3,000 to about 200,000.

8. The process as set forth in claim 7 wherein the adhesive composition is hot-melt processable at less than about 450 degrees Fahrenheit.

9. The process as set forth in claim 7 wherein the isotactic polymer comprises isotactic polypropylene.

10. The process as set forth in claim 7 wherein the isotactic polymer is selected from the group consisting of high density poylethylene, isotactic polystyrene, isotactic polybutene, and combinations thereof 11. The process as set forth in claim 7 wherein the component comprises an attachment zone.

12. A process for increasing the strength of an ear attachment zone of a diaper, the process comprising increasing the material basis weight of the ear attachment zone by introducing a material basis weight increasing agent onto the ear attachment zone to increase the material basis weight of the ear attachment zone, the material basis weight increasing agent comprising an atactic polymer and an isotactic polymer, the atactic polymer having a degree of crystallinity of less than about 20% and a number-average molecular weight of from about 1,000 to about 300,000 and the isotactic polymer having a degree of crystallinity of at least about 40% and a number-average molecular weight of from about 3,000 to about 200,000.

13. The process as set forth in claim 12 wherein the ear attachment zone has a material basis weight of from about 0.2 osy to about 0.8 osy prior to the introduction of the material basis weight increasing agent and from about 0.3 osy to about 1.0 osy after the introduction of the material basis weight increasing agent.

14. The process as set forth in claim 12 wherein the material basis weight of the ear attachment zone is increased by at least about 25%.

15. The process as set forth in claim 12 wherein the material basis weight increasing agent is hot-melt processable at less than about 450 degrees Fahrenheit.

16. The process as set forth in claim 12 wherein the material basis weight increasing agent comprises from about 50 to about 90 weight percent of the atactic polymer and from about 5 to about 50 weight percent of the isotactic polymer.

* * * * *